(12) United States Patent
Zhang et al.

(10) Patent No.: US 10,061,087 B2
(45) Date of Patent: Aug. 28, 2018

(54) MICRO-ELECTRO-MECHANICAL SYSTEM OPTICAL SWITCH AND SWITCHING NODE

(71) Applicant: Huawei Technologies Co., Ltd., Shenzhen (CN)

(72) Inventors: Peng Zhang, Wuhan (CN); Chendi Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/587,028

(22) Filed: May 4, 2017

(65) Prior Publication Data

US 2017/0235058 A1 Aug. 17, 2017

Related U.S. Application Data

(63) Continuation of application No. PCT/CN2014/090356, filed on Nov. 5, 2014.

(51) Int. Cl.
*G02B 6/35* (2006.01)
*G02B 6/293* (2006.01)

(52) U.S. Cl.
CPC ....... *G02B 6/3518* (2013.01); *G02B 6/29382* (2013.01); *G02B 6/3546* (2013.01); *G02B 6/3594* (2013.01)

(58) Field of Classification Search
CPC .......................... G02B 6/3518; G02B 6/29382
See application file for complete search history.

(56) References Cited

U.S. PATENT DOCUMENTS

| | | | | |
|---|---|---|---|---|
| 6,253,001 | B1 * | 6/2001 | Hoen | G02B 6/3518 385/16 |
| 6,816,640 | B2 * | 11/2004 | Tew | G02B 6/12019 385/18 |
| 7,106,966 | B1 | 9/2006 | Lalonde et al. | |
| 7,483,602 | B2 * | 1/2009 | Laor | G02B 6/32 385/15 |
| 8,682,117 | B1 | 3/2014 | Miglani et al. | |
| 2002/0109076 | A1 | 8/2002 | Tochio et al. | |

(Continued)

FOREIGN PATENT DOCUMENTS

| | | |
|---|---|---|
| CN | 1307690 A | 8/2001 |
| CN | 1549607 A | 11/2004 |
| JP | 2007065594 A | 3/2007 |

(Continued)

*Primary Examiner* — Omar R Rojas
(74) *Attorney, Agent, or Firm* — Slater Matsil, LLP

(57) ABSTRACT

A MEMS optical switch and a switching node are disclosed. The MEMS optical switch includes $N_1$ input ports, $N_1$ input MEMS mirrors, $M_1$ output ports, and $M_1$ output MEMS mirrors, where a first input port is configured to transmit a first optical signal to a first input MEMS mirror. The first input MEMS mirror is configured to reflect the first optical signal to a first destination output MEMS mirror, where along a straight line in which a first deflection axis is located, the first input MEMS mirror is located on an edge of the $N_1$ input MEMS mirrors, and when reflecting the received first optical signal to a first output MEMS mirror and a second output MEMS mirror, the first input MEMS mirror deflects towards an opposite direction relative to a second deflection axis.

20 Claims, 10 Drawing Sheets

(56) References Cited

U.S. PATENT DOCUMENTS

2003/0142900 A1    7/2003   Laor et al.
2008/0137172 A1    6/2008   Staker et al.

FOREIGN PATENT DOCUMENTS

| JP | 2011028235 A | 2/2011 |
|---|---|---|
| WO | 0195007 A2 | 12/2001 |
| WO | 02079852 A1 | 10/2002 |

\* cited by examiner

MICRO-ELECTRO-MECHANICAL SYSTEM OPTICAL SWITCH AND SWITCHING NODE

CROSS-REFERENCE TO RELATED APPLICATIONS

This application is a continuation of International Application No. PCT/CN2014/090356, filed on Nov. 5, 2014, the disclosure of which is hereby incorporated by reference in its entirety.

TECHNICAL FIELD

Embodiments of the present disclosure relate to the communications field, and more specifically, to a micro-electro-mechanical system optical switch and a switching node.

BACKGROUND

On a wavelength division multiplexing (WDM) optical network, a node at which multiple different ring networks intersect needs to receive a large quantity of WDM optical signals from different lines, and route these WDM optical signals to different lines according to destination nodes of these WDM optical signals. In addition, the node further has add and drop (Add/Drop) lines that are connected to an aggregation layer. The add line is used to switch optical signals that aggregate at the node from a low layer and that need to be sent to different lines to destination lines. The drop line is used to switch an optical signal that is from another node and whose destination node is the node to the node. Switching of the optical signals may be implemented by using an optical switch.

As optical network traffic is ever-increasing, there is an increasingly high requirement for throughputs of switching nodes on a backbone network and a metropolitan area network of an optical network. A three dimension micro-electro-mechanical system (3D-MEMS) optical switch is an important solution for meeting the continuously increasing throughput requirement. For example, FIG. 1a and FIG. 1b respectively show a prior-art typical switching node 100 and an N×N full cross-connect 3D-MEMS optical switch 120 in the switching node. As shown in FIG. 1a, the switching node 100 includes n wavelength division demultiplexers 110, the MEMS optical switch 120, and n wavelength division multiplexers 130. The switching node 100 can implement switching of N×N optical signals. Specifically, after optical signals from n nodes or lines are input to the n wavelength division demultiplexers 110, each optical signal is demultiplexed into m optical signals and the m optical signals are input to the MEMS optical switch 120. Optical signals that need to be dropped to a location in which the switching node is located are output from k drop ports to the location in which the switching node is located. (N−k) optical signals that need to be sent to other nodes are switched to destination output ports corresponding to destination nodes of the optical signals. In addition, optical signals that are from the location in which the switching node is located and that need to be switched to other nodes may be input from k add ports, and are switched to destination output ports corresponding to destination nodes of the optical signals, where N=n×m+k. Optical signals output from output ports of the MEMS optical switch 120 are input to the n wavelength division multiplexers 130, and each wavelength division multiplexer 130 combines input multiple optical signals into one optical signal for output. As shown in FIG. 1b, the MEMS optical switch 120 includes an input port array 121, an input MEMS mirror array 123, an output MEMS mirror array 125, and an output port array 127. The input poll array 121 and the input MEMS mirror array 123 may respectively include N input ports and N input MEMS mirrors, where N>1. The N input MEMS mirrors are corresponding to the N input ports on a one-to-one basis. The output MEMS mirror array 125 and the output port array 127 may respectively include N output MEMS mirrors and N output ports. The N output MEMS mirrors are corresponding to the N output ports on a one-to-one basis. In addition, each of the N input MEMS mirrors and the N output MEMS mirrors can perform two-dimensional deflection. As shown in FIG. 1b, an optical signal may enter the MEMS optical switch 120 from an input port. The optical signal may be an optical signal transmitted by another node or an optical signal added from the location in which the switching node is located. The optical signal may be transmitted to an input MEMS mirror corresponding to the input port. The input MEMS mirror may deflect by a specific angle, so that the optical signal is reflected to an output MEMS mirror in the output MEMS mirror array. The output MEMS mirror is corresponding to a destination output port of the optical signal. The output MEMS mirror may deflect by a specific angle, so that the optical signal is reflected to the destination output port corresponding to the output MEMS mirror. Finally, the optical switch 120 outputs the optical signal from the destination output port. An optical signal output from the destination output port may be transmitted to the node at which the MEMS optical switch 120 is located or transmitted to another node.

In FIG. 1b, it is assumed that each input MEMS mirror in the input MEMS mirror array 123 is in a rest state (at rest), that is, parallel with an xy plane, and an incidence angle for inputting a light beam is α. To enable a light beam reflected by an input MEMS mirror to reach any output MEMS mirror in the output MEMS mirror array, a light beam reflected by an input MEMS mirror located on the leftmost side needs to rotate clockwise by $\theta_1$ degrees, and correspondingly, the input MEMS mirror located on the leftmost side needs to rotate clockwise around a y axis by at least $\theta_1/2$ degrees. In this case, only a clockwise rotation capability of the input MEMS mirror located on the leftmost side is used. Similarly, an input MEMS mirror located on the rightmost side needs to rotate counterclockwise around the y axis by at least $\theta_2/2$ degrees. In this case, only a counterclockwise rotation capability of the input MEMS mirror located on the rightmost side is used. Because the input MEMS mirror array and the output MEMS mirror array include a same quantity of MEMS mirrors, all MEMS mirrors in the input MEMS mirror array and the output MEMS mirror array are the same, and a maximum clockwise rotation angle by which all the MEMS mirrors rotate around the y axis is the same as a maximum counterclockwise rotation angle by which all the MEMS mirrors rotate around the y axis. Consequently, $\theta_1$ and $\theta_2$ need to be less than the maximum rotation angle of the MEMS mirrors, which limits the quantity of MEMS mirrors in the input MEMS mirror array 123 and the output MEMS mirror array 125. Therefore, if a scale of integration of a MEMS optical switch needs to be increased, the maximum rotation angle of the MEMS mirrors needs to be increased, which is difficult to implement. In conclusion, it is difficult to implement a MEMS optical switch with larger-scale integration in the prior art, and it is difficult to meet a requirement for throughputs of switching nodes on a backbone network and a metropolitan area network.

SUMMARY

An embodiment of the present invention provides a MEMS optical switch, including $N_1$ input ports, $N_1$ input MEMS mirrors, $M_1$ output ports, and $M_1$ output MEMS mirrors. The $N_1$ input MEMS mirrors are corresponding to the $N_1$ input ports on a one-to-one basis. The $M_1$ output MEMS mirrors are corresponding to the $M_1$ output ports on a one-to-one basis. Both $M_1$ and $N_1$ are integers greater than 1. A first input port in the $N_1$ input ports is configured to transmit a first optical signal from another node to a first input MEMS mirror corresponding to the first input port. The another node is a node other than a node to which the MEMS optical switch belongs. The first input MEMS mirror is configured to deflect around at least one of a first deflection axis or a second deflection axis, so as to reflect the received first optical signal to a first destination output MEMS mirror in the $M_1$ output MEMS mirrors. A destination output port of the first optical signal is a first destination output port corresponding to the first destination output MEMS mirror. The first destination output MEMS mirror is configured to reflect, to the first destination output port, the received first optical signal reflected by the first input MEMS mirror. Along a straight line in which the first deflection axis is located, the first input MEMS mirror is located on an edge of the $N_1$ input MEMS mirrors, and when reflecting the received first optical signal to a first output MEMS mirror and a second output MEMS mirror, the first input MEMS mirror deflects from a rest state towards an opposite direction relative to the second deflection axis. The $M_1$ output MEMS mirrors include the first output MEMS mirror and the second output MEMS mirror.

Another embodiment of the present invention provides a switching node, including a MEMS optical switch, a wavelength division multiplexer, and a wavelength division demultiplexer. The MEMS optical switch includes $N_1$ input ports, $N_1$ input MEMS mirrors, $M_1$ output ports, and $M_1$ output MEMS mirrors. The $N_1$ input MEMS mirrors are corresponding to the $N_1$ input ports on a one-to-one basis. The $M_1$ output MEMS mirrors are corresponding to the $M_1$ output ports on a one-to-one basis. Both $M_1$ and $N_1$ are integers greater than 1. The wavelength division demultiplexer is configured to receive an optical signal beam including N wavelengths, split the received optical signal beam into N optical signal beams separately having a single wavelength, and transmit the N optical signal beams to the MEMS optical switch, where $N_1 \geq N \geq 1$. A first input port in the $N_1$ input ports is configured to receive an optical signal beam in the N optical signal beams transmitted by the wavelength division demultiplexer, and transmit the received optical signal beam to a first input MEMS mirror corresponding to the first input port. The first input MEMS mirror is configured to deflect around at least one of a first deflection axis or a second deflection axis, so as to reflect the received optical signal beam to a first destination output MEMS mirror in the $M_1$ output MEMS mirrors. A destination output port of the optical signal beam is a first destination output port corresponding to the first destination output MEMS mirror. The first destination output MEMS mirror is configured to reflect, to the first destination output port, the received optical signal beam reflected by the first input MEMS mirror. The first destination output port is configured to transmit, to the wavelength division multiplexer, the received optical signal beam reflected by the first destination output MEMS mirror. The wavelength division multiplexer is configured to receive at least one optical signal beam output from at least one of the $M_1$ output ports, multiplex the at least one optical signal beam to an optical signal beam including at least one wavelength, and output the optical signal beam including at least one wavelength. The at least one output port includes the first destination output port. Along a straight line in which the first deflection axis is located, the first input MEMS mirror is located on an edge of the $N_1$ input MEMS mirrors. When reflecting the received optical signal beam to a first output MEMS mirror and a second output MEMS mirror, the first input MEMS mirror deflects from a rest state towards an opposite direction relative to the second deflection axis. The $M_1$ output MEMS mirrors include the first output MEMS mirror and the second output MEMS mirror.

BRIEF DESCRIPTION OF THE DRAWINGS

To describe the technical solutions in the embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present embodiments.

It should be understood that the technical solutions of the embodiments of the present invention may be applied to various communications systems such as a wavelength division multiplexing (WDM) system, a mode division multiplexing (MDM) system, a frequency division multiplexing (FDM) system, a time division multiplexing (TDM) system, and a few mode fiber (FMF) communications system.

Figure 2:
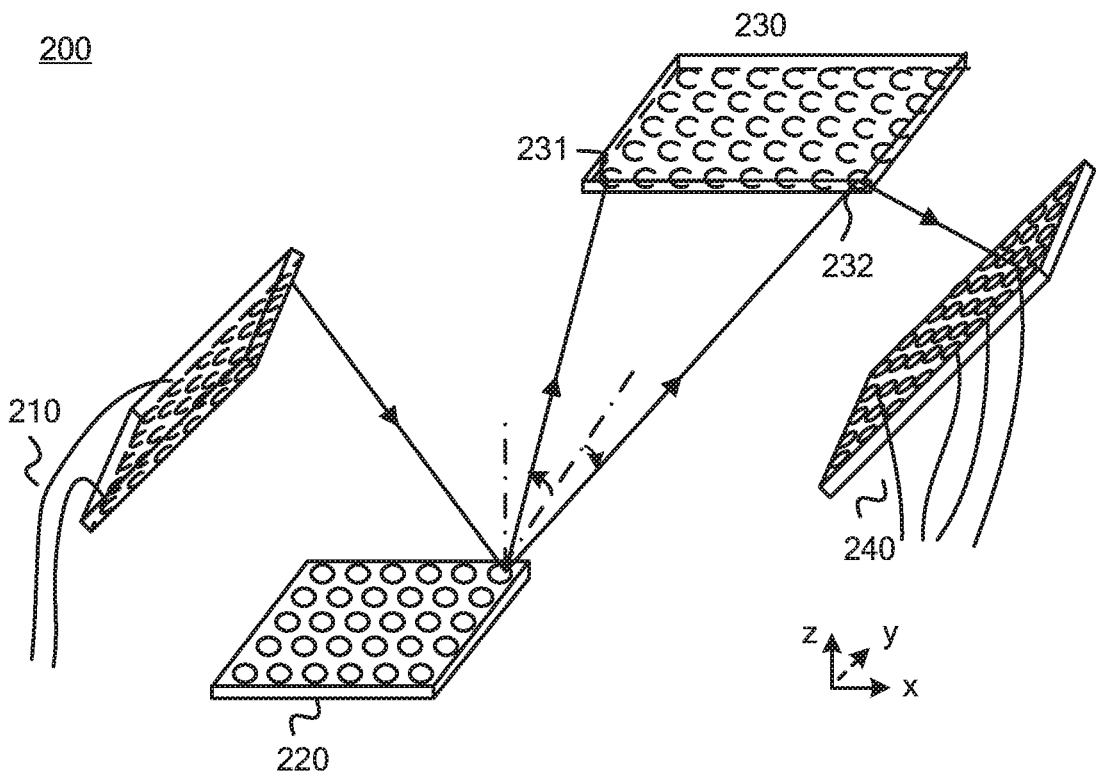
FIG. 2 is a schematic diagram of a MEMS optical switch according to an embodiment of the present invention.

FIG. 2 is a schematic diagram of a micro-electrical-mechanical system (MEMS) optical switch 200 according to an embodiment of the present invention. The MEMS optical switch 200 includes: $N_1$ input ports 210, $N_1$ input MEMS mirrors 220, $M_1$ output MEMS mirrors 230, and $M_1$ output ports 240. The $N_1$ input MEMS mirrors 220 are corresponding to the $N_1$ input ports 210 on a one-to-one basis, the $M_1$ output MEMS mirrors 230 are corresponding to the $M_1$ output ports 240 on a one-to-one basis, and both $M_1$ and $N_1$ are integers greater than 1.

A first input port 210 in the $N_1$ input ports 210 is configured to transmit a first optical signal from another node to a first input MEMS mirror 220 corresponding to the first input port 210. The another node is a node other than a node to which the MEMS optical switch 200 belongs.

The first input MEMS mirror 220 is configured to deflect around at least one of a first deflection axis or a second deflection axis, so as to reflect the received first optical signal to a first destination output MEMS mirror in the $M_1$ output MEMS mirrors 230. A destination output port of the first optical signal is a first destination output port corresponding to the first destination output MEMS mirror.

The first destination output MEMS mirror is configured to reflect, to the first destination output port, the received first optical signal reflected by the first input MEMS mirror.

The $M_1$ output MEMS mirrors 230 include a first output MEMS mirror 231 and a second output MEMS mirror 232. Along a straight line in which the first deflection axis is located, the first input MEMS mirror is located on an edge of the $N_1$ input MEMS mirrors 220, and when reflecting the received first optical signal to the first output MEMS mirror 231 and the second output MEMS mirror 232, the first input MEMS mirror 220 deflects from a rest state towards an opposite direction relative to the second deflection axis.

It should be understood that, in this embodiment of the present invention, "first" does not indicate a sequence relationship, and does not mean that use of "first" needs to be followed by use of "second," and after use of "first," "second" may not be used for description. The use of "first" is merely intended for clarity of description.

Specifically, a quantity of input MEMS mirrors 220 included in the MEMS optical switch 200 may be equal or not equal to a quantity of output MEMS mirrors 230, and the $N_1$ input MEMS mirrors 220 include the first input MEMS mirror 220. Along the straight line in which the first deflection axis is located, the first input MEMS mirror 220 may be located on an outmost edge or a second outmost edge of the $N_1$ input MEMS mirrors 220. That is, along the straight line in which the first deflection axis is located, no input MEMS mirror 220 in the $N_1$ input MEMS mirrors 220 is located on a first side of the first input MEMS mirror 220, and other input MEMS mirrors in the $N_1$ input MEMS mirrors 220 are located on a second side of the first input MEMS mirror or are projected on a same point of the straight line with the first input MEMS mirror. The first side may be the left side or the right side. For example, the first deflection axis is an x axis shown in FIG. 2. The first input MEMS mirror 220 may be an input MEMS mirror with a largest or a smallest coordinate value on the x axis in the $N_1$ input MEMS mirrors 220. In this case, the first input MEMS mirror 220 is an input MEMS mirror located on the leftmost or the rightmost side in the $N_1$ input MEMS mirrors 220 shown in FIG. 2. For another example, the first deflection axis is a y axis shown in FIG. 2. The first input MEMS mirror 220 may be an input MEMS mirror with a largest or a smallest coordinate value on the y axis in the $N_1$ input MEMS mirrors 220. However, this is not limited in this embodiment of the present invention.

When the first input MEMS mirror 220 is in a rest state, a specular surface of the first input MEMS mirror 220 may be parallel with a plane constituted by the first deflection axis and the second deflection axis. For example, the first deflection axis and the second deflection axis are respectively the x axis and the y axis, and when the first input MEMS mirror 220 is in the rest state, the specular surface of the first input MEMS mirror 220 is parallel with an xy plane.

When reflecting the first optical signal to the first output MEMS mirror 231, the first input MEMS mirror 220 deflects from the rest state towards a first direction relative to the second deflection axis. However, when reflecting the first optical signal to the second output MEMS mirror 232, the first input MEMS mirror 220 deflects from the rest state towards a second direction relative to the second deflection axis. The first direction is opposite to the second direction. Optionally, the first direction may be a clockwise direction, and the second direction is a counterclockwise direction. Alternatively, the first direction may be a counterclockwise direction, and the second direction is a clockwise direction. This is not limited in this embodiment of the present invention.

For example, the first deflection axis is the x axis, the second deflection axis is the y axis, and the first input MEMS mirror is the input MEMS mirror located on the leftmost side in the $N_1$ input MEMS mirrors. In this case, as shown in FIG. 2, the first output MEMS mirror 231 is an output MEMS mirror located on the leftmost side in the $M_1$ output MEMS mirrors 230. When reflecting the first optical signal to the first output MEMS mirror 231, the first input MEMS mirror 220 deflects counterclockwise relative to the y axis from the rest state. The second output MEMS mirror 232 is an output MEMS mirror located on the rightmost side in the $M_1$ output MEMS mirrors 230. When reflecting the first optical signal to the second output MEMS mirror 232, the first input MEMS mirror 220 deflects clockwise relative to the y axis from the rest state.

Figure 1A:
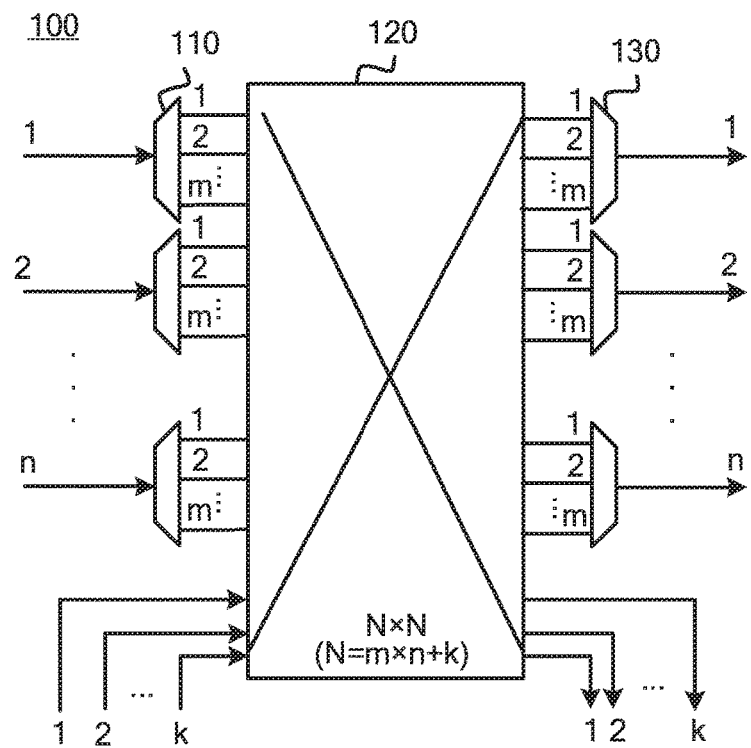
FIG. 1a is a schematic diagram of switching of an optical path of a switching node in the prior art.
Figure 1B:
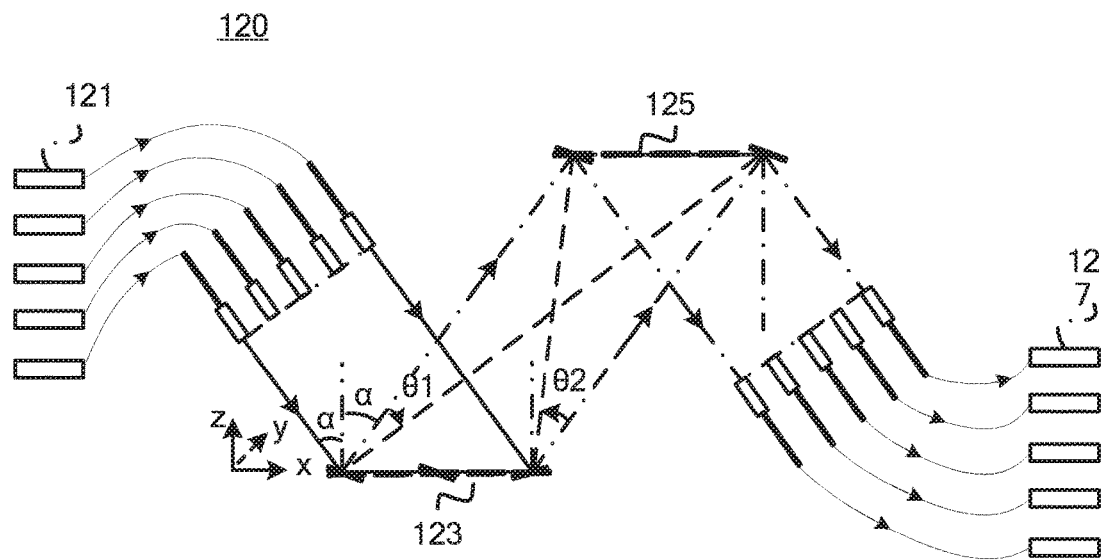
FIG. 1b is a schematic diagram of an optical path of a micro-electro-mechanical-system (MEMS) optical switch in the prior art.

In the prior art, a MEMS mirror located on an edge in a MEMS optical switch can deflect towards only one direction. For example, as shown in FIG. 1b, all input MEMS mirrors located on the leftmost side deflect clockwise when reflecting an optical signal to any output MEMS mirror, and all input MEMS mirrors located on the rightmost side deflect counterclockwise when reflecting an optical signal to any output MEMS mirror. However, in the MEMS optical switch 200 provided in this embodiment of the present invention, the first input MEMS mirror deflects from the rest state towards an opposite direction when reflecting an optical signal to the first output MEMS mirror and the second output MEMS mirror. Therefore, a rotation capability of the first input MEMS mirror can be used more efficiently. This increases a scale of the MEMS optical switch.

Specifically, as shown in FIG. 1b, $\theta_1<\theta_2$. Therefore, design of the MEMS optical switch 100 can make $\theta_2=\beta$, where $\beta$ is a maximum deflection angle of a MEMS mirror. In this case, the input MEMS mirror located on the leftmost side deflects clockwise by $\theta_1$. Therefore, a maximum clockwise deflection angle $\beta$ of the input MEMS mirror located on the leftmost side is not used most efficiently. In this embodiment of the present invention, a quantity of output MEMS mirrors may be increased without changing the maximum deflection angle of the MEMS mirror. For example, one or more output MEMS mirrors are added on the right side of the output MEMS mirror array 125 shown in FIG. 1b, so as to fully use a clockwise rotation capability and a counterclockwise rotation capability of the input MEMS mirror located on the rightmost side. In this case, a clockwise deflection angle of the input MEMS mirror located on the leftmost side is less than or equal to 13 and is greater than 01. Therefore, a rotation capability of the input MEMS mirror can be used more efficiently without changing the maximum deflection angle of the input MEMS mirror.

Therefore, the MEMS optical switch according to this embodiment of the present invention includes $N_1$ input MEMS mirrors corresponding to $N_1$ input ports on a one-to-one basis and $M_1$ output MEMS mirrors corresponding to $M_1$ output ports on a one-to-one basis. When the first input MEMS mirror reflects an optical signal to a first output MEMS mirror and reflects the optical signal to a second output MEMS mirror, the first input MEMS mirror deflects from a rest state towards an opposite direction relative to a second deflection axis. In this way, rotation angle utilization of a MEMS mirror is improved without changing a maximum rotation angle of the MEMS mirror. This increases a quantity of ports on the MEMS optical switch, improves integration, and can further meet a requirement for a throughput of a switching node.

Optionally, the first output MEMS mirror 231 may be specifically the first destination output MEMS mirror, and the second output MEMS mirror 232 may be specifically a second destination output MEMS mirror. The $M_1$ output MEMS mirrors 230 include the first destination output MEMS mirror and the second destination output MEMS mirror. If the destination output port of the first optical signal is a second destination output port corresponding to the second destination output MEMS mirror, the first input MEMS mirror 220 may be further configured to reflect the first optical signal to the second destination output MEMS mirror. When reflecting the first optical signal to the first destination output MEMS mirror and when reflecting the first optical signal to the second destination output MEMS mirror, the first input MEMS mirror 220 deflects from the rest state towards the opposite direction relative to the second deflection axis. However, this is not limited in this embodiment of the present invention.

Optionally, in this embodiment of the present invention, the $N_1$ input MEMS mirrors 220 may constitute an input MEMS mirror array, and the $M_1$ output MEMS mirrors 230 may constitute an output MEMS mirror array. In addition, optionally, a plane in which the input MEMS mirror array is located may be parallel or approximately parallel with a plane in which the output MEMS mirror array is located. However, this is not limited in this embodiment of the present invention.

Figure 3:
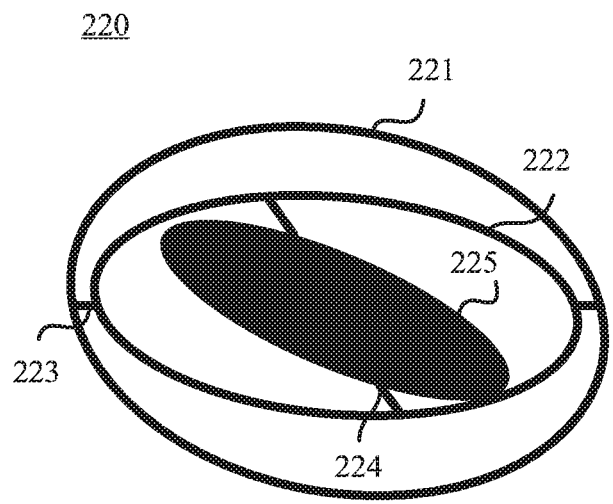
FIG. 3 is a schematic diagram of a first input MEMS mirror according to an embodiment of the present invention.

Optionally, each of the $N_1$ input MEMS mirrors 220 can deflect around the first deflection axis and the second deflection axis. For example, FIG. 3 shows a first input MEMS mirror 220. As shown in FIG. 3, the first input MEMS mirror 220 may include a chip substrate 221, a mirror frame 222, two first cantilevers 223, two second cantilevers 224, and a lens 225. Optionally, the chip substrate 221 may be a silicon substrate, the two first cantilevers 223 may be located in a same straight line, and the two second cantilevers 224 may also be located in a same straight line. The mirror frame 222 is connected to the chip substrate 221 by using the two first cantilevers 223, and the mirror frame 222 can drive the lens 225 to rotate around a direction of the first cantilever 223. In addition, the lens 225 is connected to the mirror frame 222 by using the two second cantilevers 224, and the lens 225 can rotate around a direction of the second cantilever 224. In this way, the lens 225 can separately rotate around the first cantilever 223 or the second cantilever 224, or rotate around both the first cantilever 223 and the second cantilever. In this case, the first deflection axis and the second deflection axis may be the first cantilever 223 and the second cantilever 224. However, this is not limited in this embodiment of the present invention.

In this embodiment of the present invention, all input MEMS mirrors in the $N_1$ input MEMS mirrors 220 may have a same structure. For example, all the input MEMS mirrors have a structure shown in FIG. 3. Alternatively, some input MEMS mirrors in the $N_1$ input MEMS mirrors 220 have a structure shown in FIG. 3, and other input MEMS mirrors have a structure different from that shown in FIG. 3. This is not limited in this embodiment of the present invention.

Optionally, each of the $N_1$ input MEMS mirrors 220 can reflect a received optical signal to any output MEMS mirror 230 in the $M_1$ output MEMS mirrors 230. In this way, an optical signal input from each of the $N_1$ input ports 210 can be output from any output port 240 in the $M_1$ output ports 240. In addition, each of the $M_1$ output MEMS mirrors 23o can also deflect around the first deflection axis and the second deflection axis, and can reflect a received optical signal to a corresponding output port 240. However, this is not limited in this embodiment of the present invention.

Figure 4:
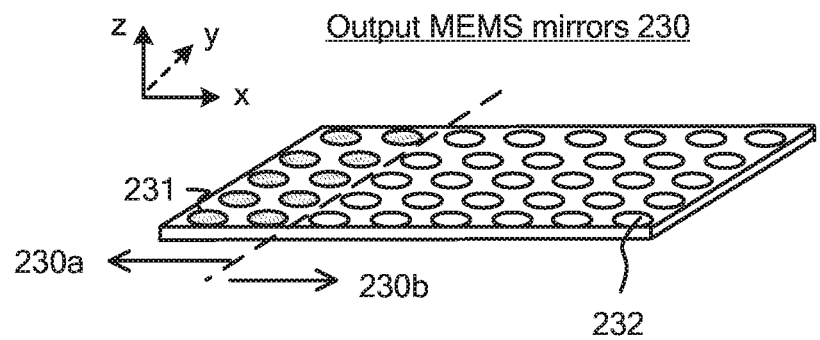
FIG. 4 is a schematic diagram of an output MEMS mirror in a MEMS optical switch according to an embodiment of the present invention.

Optionally, as shown in FIG. 4, the $M_1$ output MEMS mirrors 230 are constituted by $M_2$ local drop MEMS mirrors 230a and $M_3$ other output MEMS mirrors 230b, and the $M_1$ output ports 240 are constituted by $M_2$ local drop ports 240a and $M_3$ other output ports 240b, where $M_1>M_2\geq 1$ and $M_1>M_3>1$.

The $M_2$ local drop MEMS mirrors 230a are corresponding to the $M_2$ local drop ports 240a on a one-to-one basis, and an optical signal output from each of the $M_2$ local drop ports 240a is transmitted to a node to which the MEMS optical switch belongs.

The $M_3$ other output MEMS mirrors 230b are corresponding to the $M_3$ other output ports 240b on a one-to-one basis, and an optical signal output from each of the $M_3$ other output ports 240b is transmitted to another node.

Specifically, $M_1=M_2+M_3$. $M_2$ may be an integer greater than or equal to 1, $M_3$ may be an integer greater than $M_2$, and optionally, $M_3$ may be equal to $N_1$. However, this is not limited in this embodiment of the present invention. Optionally, the $M_2$ local drop MEMS mirrors 230a and the $M_3$ other output MEMS mirrors 230b may be arranged in any sequence. For example, the $M_2$ local drop MEMS mirrors 230a and the $M_3$ other output MEMS mirrors 230b are arranged in a staggered manner; or the $M_2$ local drop MEMS mirrors 230a and the $M_3$ other output MEMS mirrors 230b are sequentially arranged according to a category. That is, the $M_2$ local drop MEMS mirrors 230a are located on a same side of the $M_3$ other output MEMS mirrors 230b. This is not limited in this embodiment of the present invention. Preferably, if $M_2>1$, the $M_2$ local drop MEMS mirrors 230a may constitute a local drop MEMS mirror array, and the $M_3$ other output MEMS mirrors 230b may constitute another output MEMS mirror array. However, this is not limited in this embodiment of the present invention.

The $M_2$ local drop MEMS mirrors 230a and the $M_2$ local drop ports 240a are configured to transmit an optical signal from another node to the node to which the MEMS optical switch belongs. The $M_3$ other output MEMS mirrors 230b and the $M_3$ other output ports 240b are configured to transmit an optical signal from a first another node to a second another node.

Optionally, each MEMS mirror in this embodiment of the present invention can deflect around the first deflection axis and the second deflection axis. The first deflection axis and the second deflection axis may be perpendicular to each other. For example, the first deflection axis and the second deflection axis are respectively an x axis and a y axis that are shown in FIG. 3. When the first input MEMS mirror 220 receives the first optical signal, a processor of the node to which the MEMS optical switch belongs may determine a destination output port 240 of the first optical signal. A drive of the node to which the MEMS optical switch belongs may determine, according to the destination output port 240 determined by the processor, a drive voltage required by the first input MEMS mirror 220, and provide the drive voltage for the first input MEMS mirror 220. In the drive voltage provided by the drive, the first input MEMS mirror 220 may deflect around the first deflection axis and/or the second deflection axis by a specific angle, so as to reflect the first optical signal to an output MEMS mirror 230 corresponding to the destination output port 240. The first optical signal may be from another switching node other than a switching node at which the MEMS optical switch 200 is located. Specifically, if the destination output port of the first optical signal is a local drop port in the $M_2$ local drop ports, for example, a first local drop port 240a, the first input MEMS mirror 220 may deflect around the first deflection axis and/or the second deflection axis by a specific angle, so as to reflect the first optical signal to a first local drop MEMS mirror 230a corresponding to the first local drop port 240a. However, if the destination output port of the first optical signal is another output port in the $M_3$ other output ports, for example, a first another output port 240b, the first input MEMS mirror 220 may deflect around the first deflection axis and/or the second deflection axis by a specific angle, so as to reflect the first optical signal to a first another output MEMS mirror 230b corresponding to the first another output port 240b. Preferably, when reflecting the received first optical signal to the first local drop MEMS mirror 230a, the first input MEMS mirror 220 may deflect around the second deflection axis from the rest state towards a first direction. However, when reflecting the received first optical signal to the first another output MEMS mirror 230b, the first input MEMS mirror 220 may deflect around the second deflection axis from the rest state towards a second direction. The first direction is opposite to the second direction. Specifically, when reflecting the received first optical signal to the first local drop MEMS mirror 230a, the first input MEMS mirror 220 may deflect clockwise around the second deflection axis from the rest state by a specific angle. In this case, when reflecting the first optical signal to the first another output MEMS mirror 230b, the first input MEMS mirror 220 deflects counterclockwise around the second deflection axis from the rest state by a specific angle. Alternatively, when reflecting the received first optical signal to the first local drop MEMS mirror 230a, the first input MEMS mirror 220 deflects counterclockwise around the second deflection axis from the rest state by a specific angle. In this case, when reflecting the first optical signal to the first another output MEMS mirror 23b, the first input MEMS mirror 220 deflects clockwise around the second deflection axis from the rest state by a specific angle. However, this is not limited in this embodiment of the present invention.

Optionally, the $M_2$ local drop MEMS mirrors 230a include the first output MEMS mirror 231, and the $M_3$ other output MEMS mirrors 230b include the second output MEMS mirror 232.

Specifically, the first input MEMS mirror 220 may be located on an edge of the $N_1$ input MEMS mirrors 220, and more specifically, may be located on an edge close to a side of the $M_1$ output MEMS mirrors 230. However, this is not limited in this embodiment of the present invention.

Optionally, in another embodiment, as shown in FIG. 4, in a direction of at least one of the first deflection axis or the second deflection axis, the $M_2$ local drop MEMS mirrors 230a are adjacently arranged and the $M_3$ other output MEMS mirrors 230b are adjacently arranged.

Figure 5:
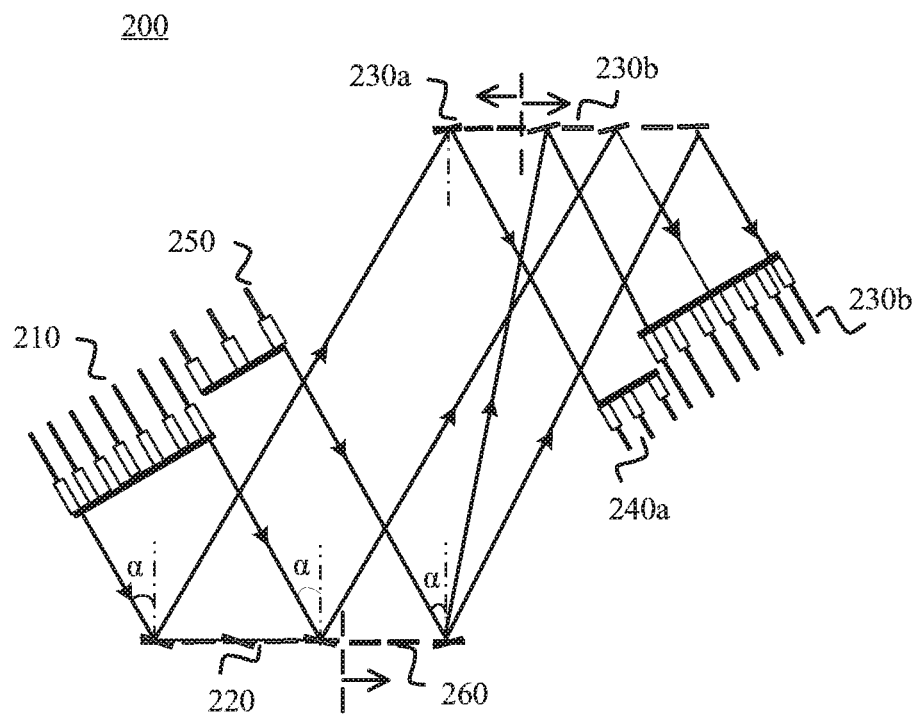
FIG. 5 is another schematic diagram of a MEMS optical switch according to an embodiment of the present invention.
Figure 6:
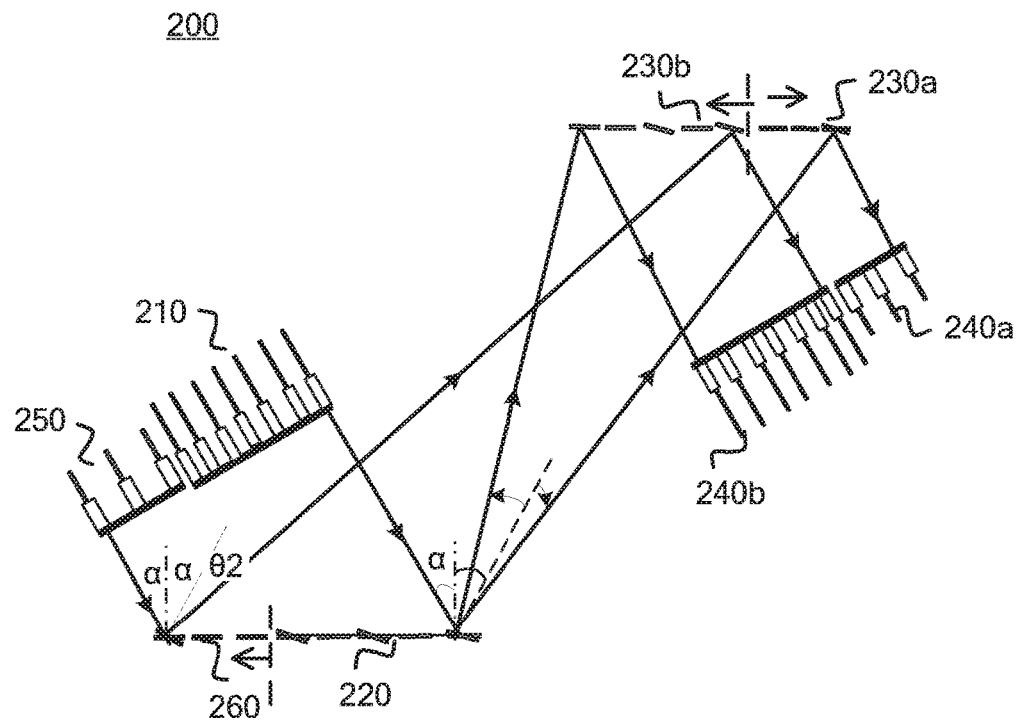
FIG. 6 is still another schematic diagram of a MEMS optical switch according to an embodiment of the present invention.

Optionally, in another embodiment, as shown in FIG. 5 and FIG. 6, the MEMS optical switch 200 further includes $N_2$ add ports 250 and $N_2$ add MEMS mirrors 260, where $N_2 \geq 1$. The $N_2$ add MEMS mirrors 260 are corresponding to the $N_2$ add ports 250 on a one-to-one basis.

A first add port 250 in the $N_2$ add ports 250 is configured to transmit a second optical signal from a node to which the MEMS optical switch belongs to a first add MEMS mirror 260 corresponding to the first add port 250.

The first add MEMS mirror 260 is configured to deflect around at least one of the first deflection axis or the second deflection axis, so as to reflect the received second optical signal to a second destination output MEMS mirror in the $M_1$ output MEMS mirrors 230.

A destination output port of the second optical signal is a second destination output port corresponding to the second destination output MEMS mirror.

The second destination output MEMS mirror is configured to reflect the received second optical signal to the second destination output port.

$N_2$ may be less than or equal to $M_3$, and $N_2$ may be equal to $M_2$. However, this is not limited in this embodiment of the present invention. The first add port may be an add port in the $N_2$ add ports 250. The first add MEMS mirror 260 may be an add MEMS mirror in the $N_2$ add MEMS mirrors 260. Optionally, the $N_2$ add MEMS mirrors 260 may constitute an add MEMS mirror array. Correspondingly, the $N_2$ add ports 250 may constitute an add port array. In this case, a plane in which the add MEMS mirror array is located may be parallel or approximately parallel with the input MEMS mirror array and/or the output MEMS mirror array. This is not limited in this embodiment of the present invention.

Specifically, the second optical signal may include data that is modulated on the second optical signal and that is sent by the node to which the MEMS optical switch belongs. The processor of the node to which the MEMS optical switch belongs may determine a destination node of the second optical signal, and determine the second destination output port according to the destination node of the second optical signal. The drive of the node to which the MEMS optical switch belongs may determine, according to the second destination output port determined by the processor, a drive voltage required by the first add MEMS mirror, and provide the drive voltage to the first add MEMS mirror. Driven by the drive voltage provided by the drive, the first add MEMS mirror 260 may deflect around the first deflection axis and/or the second deflection axis by a specific angle, so as to reflect the second optical signal to the second destination output MEMS mirror. The second destination output port may be specifically another output port, that is, the $M_3$ other output ports 240b include the second destination output port. Correspondingly, the $M_3$ other output MEMS mirrors 230b include the second destination output MEMS mirror. However, this is not limited in this embodiment of the present invention.

Optionally, in this embodiment of the present invention, each of the $N_2$ add MEMS mirrors 260 can deflect around the first deflection axis and/or the second deflection axis by a specific angle, so as to reflect the second optical signal to any output MEMS mirror 230 in the $M_1$ output MEMS mirrors 230. That is, an optical signal input from each of the $N_2$ add ports 250 can be output from any output port in the $M_1$ output ports 240. However, this is not limited in this embodiment of the present invention.

Optionally, in another embodiment, the MEMS optical switch 200 may further include at least one of the following types of collimators: $N_1$ input collimators, $M_1$ output collimators, or $N_2$ add collimators. A collimator may include an optical fiber and a microlens. The $N_1$ input collimators may be corresponding to the $N_1$ input ports 210 and the $N_1$ input MEMS mirrors 220 on a one-to-one basis. In this case, an input port 210 in the $N_1$ input ports 210 is specifically configured to transmit an optical signal to a corresponding input collimator. The corresponding input collimator is configured to perform collimation processing on the received optical signal, and transmit the processed optical signal to a corresponding input MEMS mirror. Similarly, the $N_2$ add collimators may be corresponding to the $N_2$ add ports 250 and the $N_2$ add MEMS mirrors 260 on a one-to-one basis. In this case, an add port 250 in the $N_2$ add ports 250 is specifically configured to transmit an optical signal to a corresponding add collimator. The corresponding add collimator is configured to perform collimation processing on the received optical signal, and transmit the processed optical signal to a corresponding add MEMS mirror. However, this is not limited in this embodiment of the present invention.

Similarly, the $M_1$ output collimators may be corresponding to the $M_1$ output ports 240 and the $M_1$ output MEMS mirrors 230 on a one-to-one basis. In this case, an output MEMS mirror in the $M_1$ output MEMS mirrors 230 is specifically configured to reflect, to a corresponding output collimator, a received optical signal reflected by an input MEMS mirror. The corresponding output collimator is configured to perform collimation processing on the received optical signal, and transmit the processed optical signal to a corresponding output port. Optionally, in another embodiment, if the $M_1$ output MEMS mirrors 230 are constituted by the $M_2$ local drop MEMS mirrors 230a and the $M_3$ other output MEMS mirrors 230b, the $M_1$ output collimators may include $M_2$ local drop collimators and $M_3$ another output collimators. The $M_2$ local drop collimators may be corresponding to the $M_2$ local drop MEMS mirrors and the $M_2$ local drop ports on a one-to-one basis, and the $M_3$ another output collimators are corresponding to the $M_3$ other output MEMS mirrors and the $M_3$ other output ports on a one-to-one basis. However, this is not limited in this embodiment of the present invention.

It may be learned from the foregoing that, after an optical signal beam from another switching node is reflected to the MEMS optical switch 200, the optical signal may have the following transmission path: an input port, an input collimator, an input MEMS mirror, a local drop MEMS mirror, a local drop collimator, and a local drop port; or an input port, an input collimator, an input MEMS mirror, another output MEMS mirror, another output collimator, and another output port. However, this is not limited in this embodiment of the present invention.

In this way, processing of a collimator can decrease a divergence angle of the optical signal. Therefore, the optical signal can be transmitted for a relatively long distance in free space, so as to improve overall performance of the MEMS optical switch.

Figure 7:
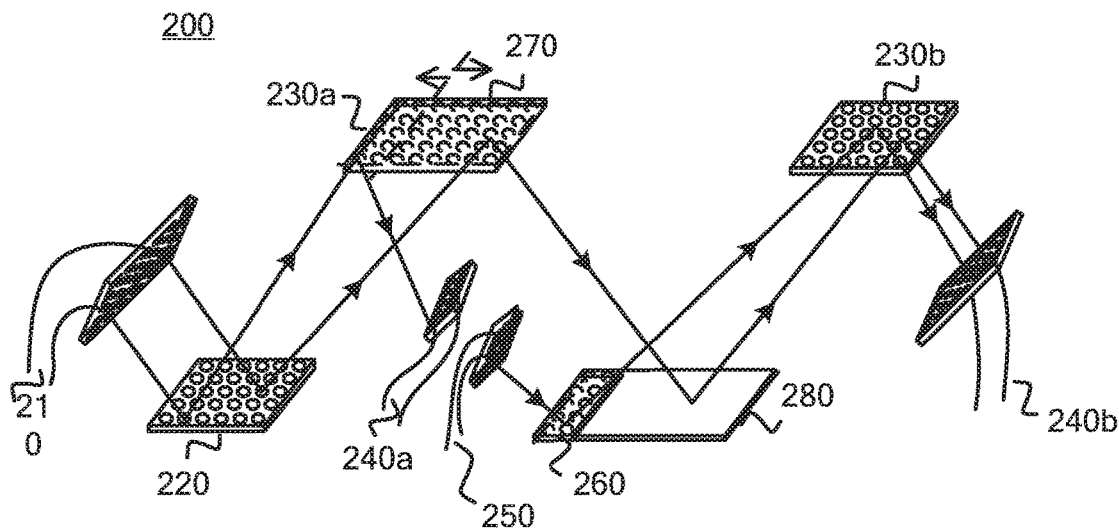
FIG. 7 is another schematic diagram of a MEMS optical switch according to an embodiment of the present invention.

Optionally, in another embodiment, as shown in FIG. 7, the MEMS optical switch 200 further includes $N_3$ first intermediate MEMS mirrors 270, where $N_3>1$.

The first input MEMS mirror 220 is specifically configured to deflect around at least one of the first deflection axis or the second deflection axis, so as to directly reflect the received first optical signal to a first intermediate MEMS mirror 270 in the $N_3$ first intermediate MEMS mirrors 270.

The first intermediate MEMS mirror 270 is configured to reflect, to the first destination output MEMS mirror 230, the received first optical signal reflected by the first input MEMS mirror 220.

The first destination output MEMS mirror 230 is specifically configured to reflect, to the first destination output port 240, the received first optical signal reflected by the first intermediate MEMS mirror 270.

In this case, the first intermediate MEMS mirror 270 is configured to receive the first optical signal reflected by the first input MEMS mirror 220, and reflect the received first optical signal to the first destination output MEMS mirror. Correspondingly, the first destination output MEMS mirror is configured to receive the first optical signal reflected by the first intermediate MEMS mirror 270, and transmit the received first optical signal to the first destination output port. The first destination output port may be a local drop port or another output port. This is not limited in this embodiment of the present invention.

Preferably, $N_3$ may be equal to $M_1$, and $M_1=M_2+M_3$; or $N_3$ may be equal to $M_3$. However, this is not limited in this embodiment of the present invention. Optionally, if $N_3=M_3$, the $N_3$ first intermediate MEMS mirrors 270 may be corresponding to the $M_3$ other output MEMS mirrors 230b on a one-to-one basis. In this case, if the first destination output MEMS mirror is specifically a first another output MEMS mirror 230b in the $M_3$ other output MEMS mirrors 230b, the first input MEMS mirror 220 is specifically configured to deflect around at least one of the first deflection axis or the second deflection axis, so as to directly reflect the received first optical signal to a first intermediate MEMS mirror 270 corresponding to the first another output MEMS mirror 230b; and the first intermediate MEMS mirror 270 corresponding to the first another output MEMS mirror 230b is configured to reflect, to the first another output MEMS mirror 230b, the received first optical signal reflected by the first input MEMS mirror 220. However, this is not limited in this embodiment of the present invention.

Optionally, the $N_3$ first intermediate MEMS mirrors 270 may constitute a first intermediate MEMS mirror array. Alternatively, the $N_3$ first intermediate MEMS mirrors 270 and the $M_2$ local drop MEMS mirrors 230a constitute a MEMS mirror array, and the $M_3$ other output MEMS mirrors 230b constitute another output MEMS mirror array. In this case, the plane in which the input MEMS mirror array constituted by the $N_1$ input MEMS mirrors 220 is located, a plane in which the MEMS mirror array constituted by the $N_3$ first intermediate MEMS mirrors 270 and the $M_2$ local drop MEMS mirrors 230a is located, and a plane in which the another output MEMS mirror array constituted by the $M_3$ other output MEMS mirrors 230b is located may be parallel or approximately parallel. However, this is not limited in this embodiment of the present invention.

Correspondingly, the $N_3$ first intermediate MEMS mirrors and the $M_2$ local drop MEMS mirrors constitute the MEMS mirror array, and in the direction of at least one of the first deflection axis or the second deflection axis, the $N_3$ first intermediate MEMS mirrors 270 are adjacently arranged and the $M_2$ local drop MEMS mirrors 230a are adjacently arranged.

Specifically, the $N_3$ first intermediate MEMS mirrors 270 and the $M_2$ local drop MEMS mirrors 230a may be located on two sides of the MEMS mirror array. That is, in a direction of the first deflection axis or the second deflection axis, all the $M_2$ local drop MEMS mirrors 230a may be located on a same side of any first intermediate MEMS mirror in the $N_3$ first intermediate MEMS mirrors 270. Alternatively, some local drop MEMS mirrors 230a are located on a same side of the $N_3$ first intermediate MEMS mirrors 270, and locations of the rest local drop MEMS mirrors 230a may be the same as locations of one or more first intermediate MEMS mirrors 270 in the $N_3$ first intermediate MEMS mirrors 270. However, this is not limited in this embodiment of the present invention.

Optionally, in another embodiment, as shown in FIG. 7, the MEMS optical switch 200 further includes a reflection element 280.

If the $M_3$ other output ports 240b include the first destination output port, the first intermediate MEMS mirror 270 is configured to reflect, to the reflection element 280, the received first optical signal reflected by the first input MEMS mirror 220.

The reflection element 280 is configured to reflect, to the first destination output MEMS mirror, the received first optical signal reflected by the first intermediate MEMS mirror 270.

The first destination output MEMS mirror is specifically configured to reflect, to the first destination output port, the received first optical signal reflected by the reflection element 280.

In this case, the first destination output port belongs to another output port, and correspondingly, the first destination MEMS mirror belongs to another output MEMS mirror. The first intermediate MEMS mirror 270 is configured to receive the first optical signal reflected by the first input MEMS mirror 220, and reflect the received first optical signal to the reflection element 280. Correspondingly, the reflection element 280 receives the first optical signal reflected by the first intermediate MEMS mirror 270, and reflects the received first optical signal to the first destination output MEMS mirror. Correspondingly, the first destination output MEMS mirror is configured to receive the first optical signal reflected by the reflection element 280, and transmit the received first optical signal to the first destination output port. The first optical signal output from the first destination output port is transmitted to another node. This is not limited in this embodiment of the present invention.

Optionally, in another embodiment, the reflection element 280 includes a first reflection mirror and/or $N_4$ second intermediate MEMS mirrors, where $N_4 > 1$.

Specifically, the reflection element 280 may include only a first reflection mirror 281. In this case, the first reflection mirror 281 may be parallel or approximately parallel with the plane in which the output MEMS mirror array constituted by the $M_1$ output MEMS mirrors 230 is located and the plane in which the input MEMS mirror array constituted by the $N_1$ input MEMS mirrors 220 is located, or further parallel or approximately parallel with the plane in which the add MEMS mirror array constituted by the $N_2$ add MEMS mirrors 260 is located. Optionally, in another embodiment, the add MEMS mirror array constituted by the $N_2$ add MEMS mirrors 260 and the first reflection mirror 281 may be located in a same plane. However, this is not limited in this embodiment of the present invention.

In this case, the first reflection mirror 281 is specifically configured to receive the first optical signal reflected by the first intermediate MEMS mirror 270, and reflect the received first optical signal to the first destination output MEMS mirror. The first destination output MEMS mirror is specifically configured to receive the first optical signal reflected by the first reflection mirror 281, and transmit the received first optical signal reflected by the first reflection mirror 281 to the first destination output port. However, this is not limited in this embodiment of the present invention.

Figure 8:
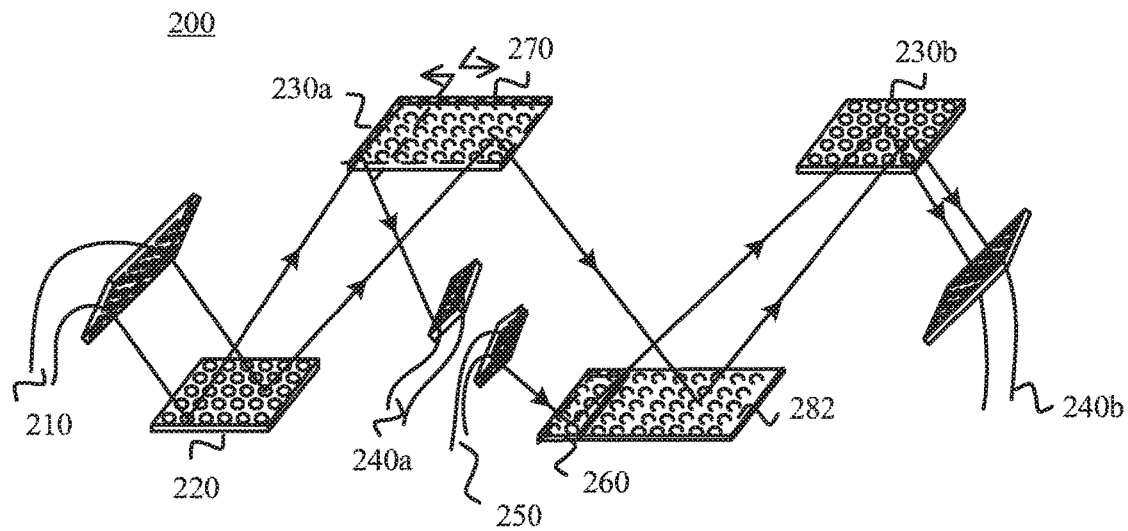
FIG. 8 is still another schematic diagram of a MEMS optical switch according to an embodiment of the present invention.
Figure 9:
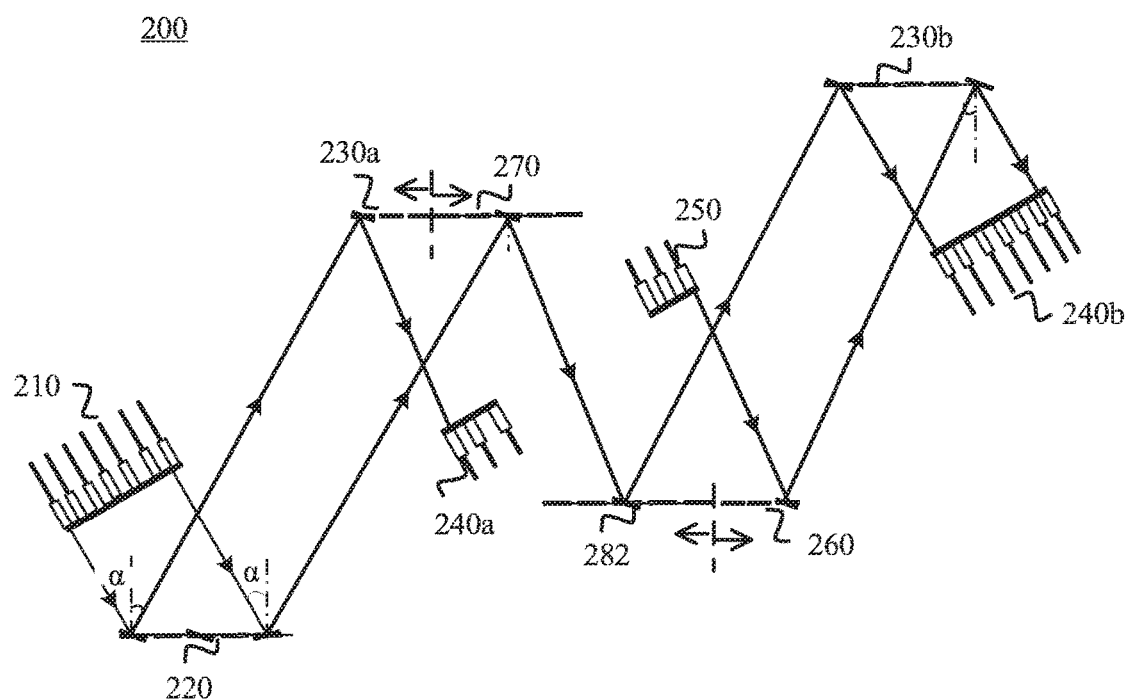
FIG. 9 is a schematic diagram of still another optical path of a MEMS optical switch according to an embodiment of the present invention.

Optionally, in another embodiment, as shown in FIG. 8 and FIG. 9, the reflection element 280 may include only $N_4$ second intermediate MEMS mirrors 282. In this case, the $N_4$ second intermediate MEMS mirrors 282 constitute a second intermediate MEMS mirror array. The second intermediate MEMS mirror array may be parallel or approximately parallel with the plane in which the output MEMS mirror array constituted by the $M_1$ output MEMS mirrors 230 is located and the plane in which the input MEMS mirror array constituted by the $N_1$ input MEMS mirrors 220 is located, or further parallel or approximately parallel with the plane in which the add MEMS mirror array constituted by the $N_2$ add MEMS mirrors 260 is located. Optionally, in another embodiment, the $N_2$ add MEMS mirrors 260 and the $N_4$ second intermediate MEMS mirrors 282 may be located in a same plane, and the $N_2$ add MEMS mirrors 260 and the $N_4$ second intermediate MEMS mirrors 282 may constitute a MEMS mirror array. In this case, the $N_2$ add MEMS mirrors 260 and the $N_4$ second intermediate MEMS mirrors 282 may be respectively located on two sides of the MEMS mirror array. However, this is not limited in this embodiment of the present invention.

Optionally, in another embodiment, planes in which all MEMS mirror arrays included in the MEMS optical switch 200 are located may be parallel or approximately parallel to each other, and the reflection element 280 may be parallel or approximately parallel with all the MEMS mirror arrays. This is not limited in this embodiment of the present invention.

Figure 10:
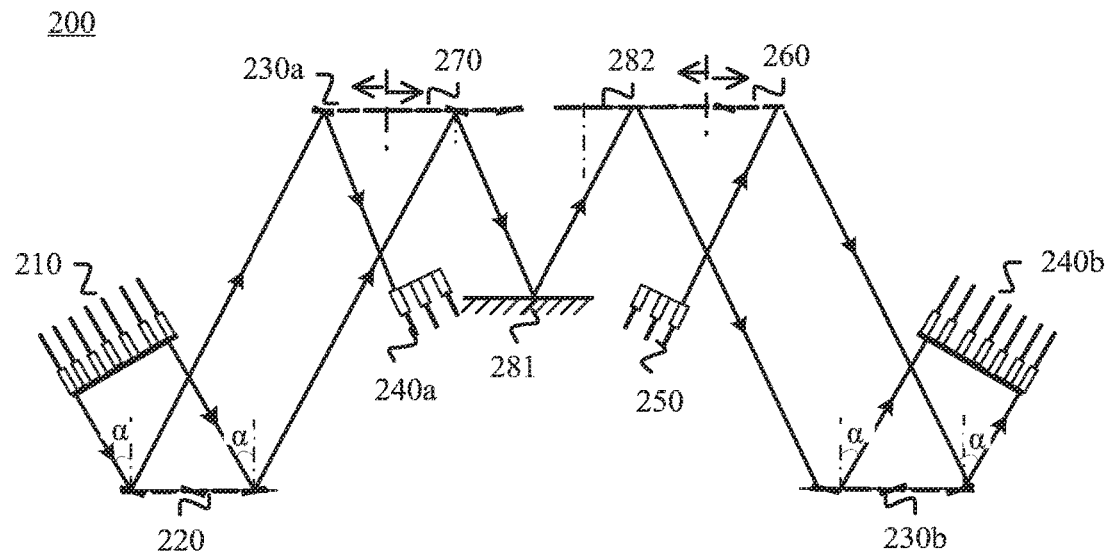
FIG. 10 is a schematic diagram of still another optical path of a MEMS optical switch according to an embodiment of the present invention.
Figure 11:
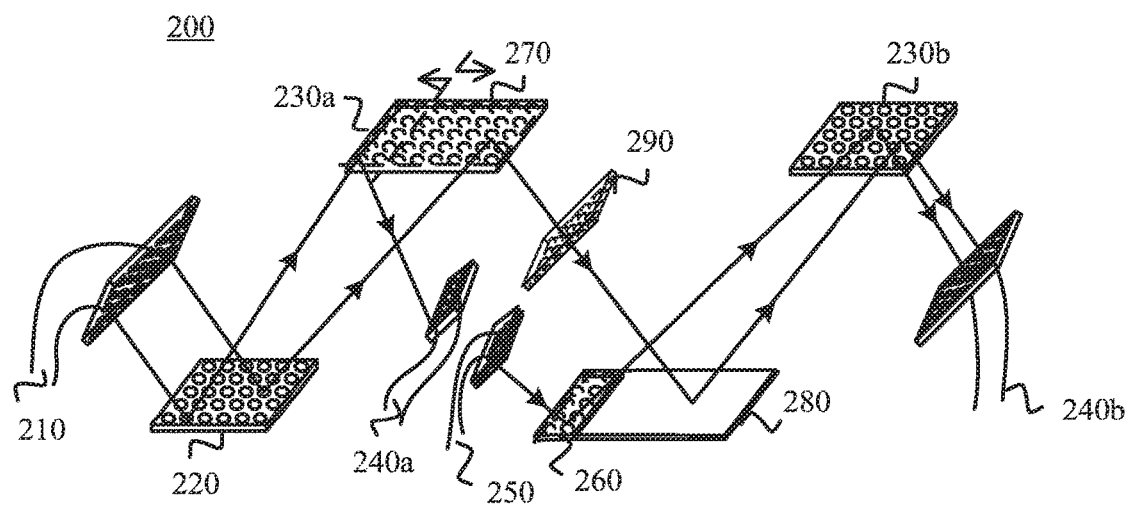
FIG. 11 is still another schematic diagram of a MEMS optical switch according to an embodiment of the present invention.

Optionally, in another embodiment, as shown in FIG. 10, the reflection element 280 includes both the first reflection mirror 281 and the $N_4$ second intermediate MEMS mirrors 282. In this case, the first intermediate MEMS mirror 270 is specifically configured to reflect, to the first reflection mirror 281, the received first optical signal reflected by the first input MEMS mirror 220; the first reflection mirror 281 is configured to reflect, to a second intermediate MEMS mirror 282 in the $N_4$ second intermediate MEMS mirrors 282, the received first optical signal reflected by the first intermediate MEMS mirror 270; and the second intermediate MEMS mirror 282 is configured to reflect the received first optical signal reflected by the first reflection mirror 281 to the first destination output MEMS mirror.

Specifically, $N_4$ may be equal to $N_3$. However, this is not limited in this embodiment of the present invention. In this case, the first destination output MEMS mirror is specifically configured to receive the first optical signal reflected by the second intermediate MEMS mirror 282, and transmit the received first optical signal to the first destination output port. Optionally, the $N_4$ second intermediate MEMS mirrors 282 may constitute a second intermediate MEMS mirror array, and the first reflection mirror 281 may be parallel or approximately parallel with the second intermediate MEMS mirror array. However, this is not limited in this embodiment of the present invention.

In this way, based on use of reflection by a first reflection mirror and a second intermediate MEMS mirror in the reflection element, larger installation and fixing space can be provided for an add collimator and a local drop collimator without increasing an optical path length. Therefore, requirements for outline dimensions of the add collimator and the local drop collimator are lowered, which can further make it less difficult to precisely assemble the optical switch and manufacture the add collimator and the drop collimator.

Optionally, in an embodiment, as shown in FIG. 10, the MEMS optical switch 200 further includes $N_3$ microlenses 290. In this case, the first intermediate MEMS mirror 270 is specifically configured to reflect, to a first microlens 290 in the $N_3$ microlenses 290, the received first optical signal reflected by the first input MEMS mirror 220; the first microlens 290 is configured to perform collimation processing on the received first optical signal reflected by the first intermediate MEMS mirror 270, and transmit the processed first optical signal to the reflection element 280; and the reflection element 280 is specifically configured to receive the first optical signal that has undergone the collimation processing performed by the first microlens 290.

Optionally, the $N_3$ microlenses 290 may be corresponding to the $N_3$ first intermediate MEMS mirrors 270 on a one-to-one basis, and the $N_3$ microlenses 290 may constitute a microlens array. However, this is not limited in this embodiment of the present invention. A plane in which the microlens array is located may be perpendicular to a direction of an incident optical signal. For example, if an incidence angle of an incident optical signal is $\beta$ when the incident optical signal is incident on the first intermediate MEMS mirror array, an angle between the plane in which the microlens array is located and the first intermediate MEMS mirror array is also $\beta$. However, this is not limited in this embodiment of the present invention. In this way, the collimation processing performed by the microlens on the first optical signal may decrease a divergence angle of the first optical signal, decrease a size of a light spot of the first optical signal in an output collimator end face, and reduce a light power loss, thereby improving coupling output efficiency.

Figure 12:
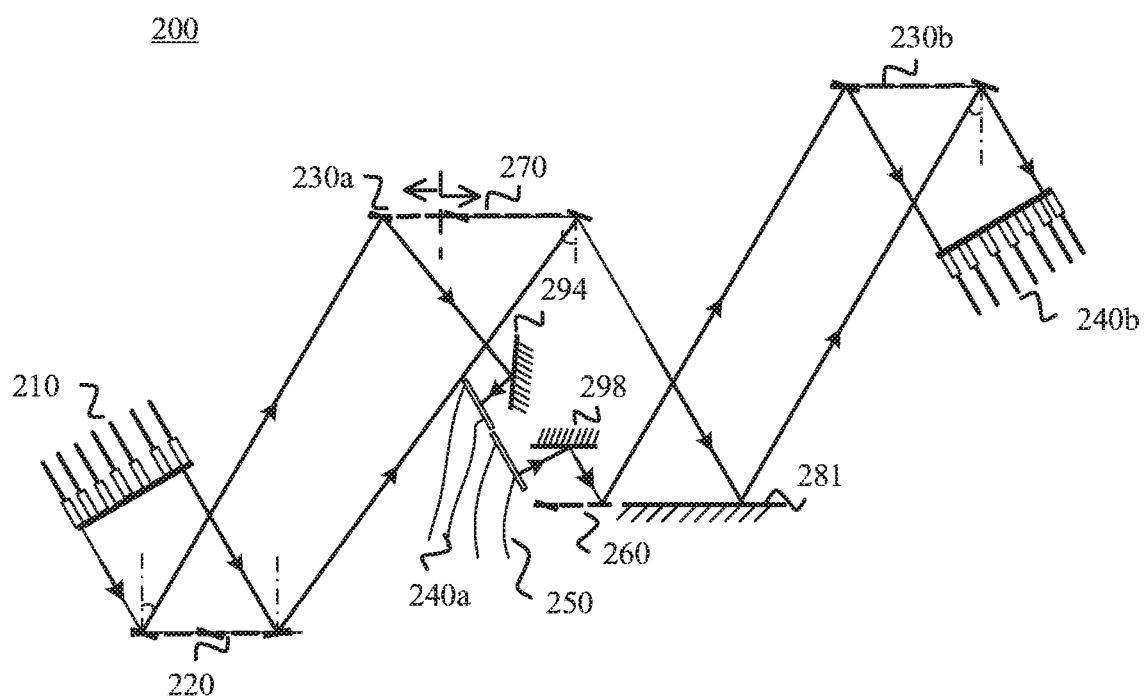
FIG. 12 is a schematic diagram of still another optical path of a MEMS optical switch according to an embodiment of the present invention.

Optionally, in another embodiment, as shown in FIG. 12, the MEMS optical switch 200 further includes at least one of a second reflection mirror 294 or a third reflection mirror 298.

Each of the $M_2$ local drop MEMS mirrors 230a is specifically configured to transmit an optical signal to a corresponding local drop port 240a by means of reflection by the second reflection mirror 294.

Each add port 250 in the $N_2$ add ports 250 is specifically configured to transmit an optical signal to a corresponding add MEMS mirror 260 by means of reflection by the third reflection mirror 298.

Specifically, a local drop MEMS mirror 230a in the $M_2$ local drop MEMS mirrors 230a is configured to reflect an optical signal to the second reflection mirror 294. The second reflection mirror 294 receives the optical signal reflected by the local drop MEMS mirror 230a, and reflects the received optical signal to a local drop port corresponding to the local drop MEMS mirror 230a. Optionally, in another embodiment, if the MEMS optical switch 200 further includes the $M_2$ local drop collimators, the second reflection mirror 294 is configured to reflect the received optical signal to a local drop collimator corresponding to the local drop MEMS mirror 230a. However, this is not limited in this embodiment of the present invention.

Similarly, an add port 250 in the $N_2$ add ports 250 is configured to transmit an optical signal to the third reflection mirror 298. The third reflection mirror 298 receives the optical signal transmitted by the add port 250, and reflects the received optical signal to an add MEMS mirror 260 corresponding to the add port 250. Optionally, in another embodiment, if the MEMS optical switch 200 further includes the $N_2$ add collimators, the add port 250 is specifically configured to transmit the optical signal to an add collimator corresponding to the add port 250, and the add collimator performs collimation processing on the received optical signal, and transmits the processed optical signal to the third reflection mirror 298. Correspondingly, the third reflection mirror 298 is configured to receive the optical signal transmitted by the add collimator, and reflect the received optical signal to the add port 250 corresponding to the add collimator. However, this is not limited in this embodiment of the present invention.

An angle of the second reflection mirror 294 and an angle of the third reflection mirror 298 may be adjusted according to locations and optical paths of the add collimator and the local drop collimator. In this way, outline dimensions of the add collimator array and the local drop collimator array can be reduced, a length of an optical path between the first intermediate MEMS mirror and the reflection element is shortened, an optical path loss is reduced, and impact brought by a tail fiber in the add collimator and the local drop collimator on a transmission path of an optical signal is avoided.

Figure 13:
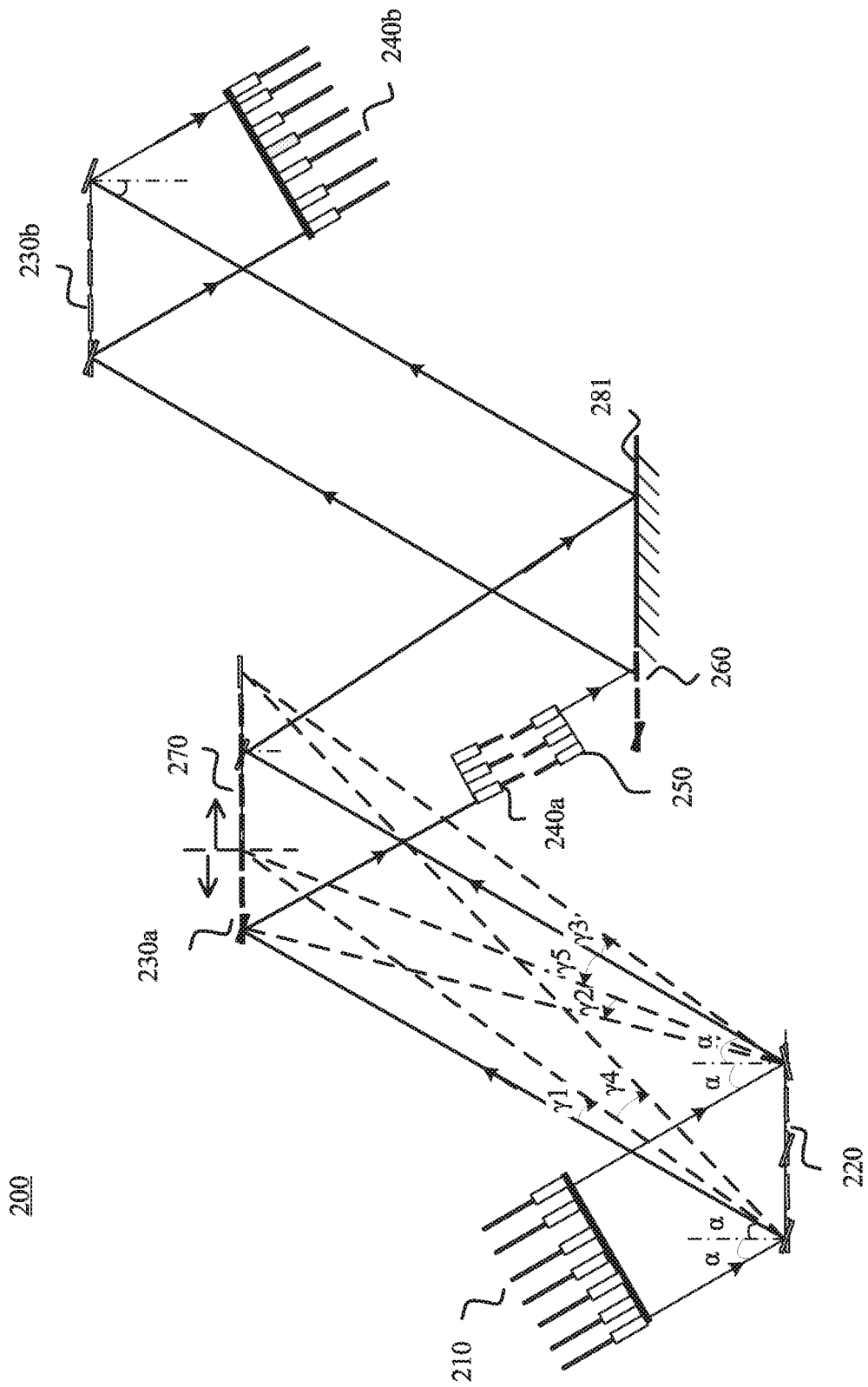
FIG. 13 is a schematic diagram of an optical path of the MEMS optical switch shown in FIG. 7.

FIG. 13 shows an optical path diagram corresponding to the MEMS optical switch shown in FIG. 7. It is assumed that a maximum rotation angle of all MEMS mirrors in the MEMS optical switch around the y axis is $\pm\beta°$. As shown in FIG. 13, when an input MEMS mirror located on the leftmost side in the input MEMS mirror array is in a rest state, that is, a specular surface of the input MEMS mirror overlaps with the xy plane, the input MEMS mirror can reflect an incident optical signal whose incidence angle is a to a local drop MEMS mirror located on the leftmost side in the $M_2$ local drop MEMS mirrors. If the input MEMS mirror rotates around the y axis by an angle $+\gamma_1°/2$, a reflected optical signal of the incident optical signal rotates around the y axis by an angle $+\gamma_1°$, and is reflected to a local drop MEMS mirror located on the rightmost side in the $M_2$ local drop MEMS mirrors. However, if the input MEMS mirror continues to rotate around the y axis by an angle $+\gamma_4°/2$, the reflected optical signal of the incident optical signal continues to rotate around the y axis by an angle $+\gamma_4°$, and is reflected to a first intermediate MEMS mirror located on the rightmost side in the $N_3$ first intermediate MEMS mirrors. Therefore, to enable the input MEMS mirror to reflect the optical signal to any MEMS mirror in the $M_2$ local drop MEMS mirrors and the $N_3$ first intermediate MEMS mirrors, the following condition needs to be met: $(+\gamma_1°/2)+(+\gamma_4°/2) \leq \pm\beta°$. In this way, after the foregoing condition is met, capabilities of the input MEMS mirror to rotate clockwise and counterclockwise around the y axis may be used as much as possible by setting values of $M_2$ and $N_3$ and relative locations of all MEMS mirrors. Therefore, $M_2+N_3$ is a relatively large value.

When an input MEMS mirror located on the rightmost side in the input MEMS mirror array is in a rest state, the input MEMS mirror can reflect an incident optical signal whose incidence angle is a to a first intermediate MEMS mirror in the $N_3$ first intermediate MEMS mirrors (a reflected optical signal is indicated by a dashed line). If the input MEMS mirror rotates around a y direction by an angle $+\gamma_3°/2$, a reflected optical signal of the incident optical signal rotates around the y axis by an angle $+\gamma_3°$, and is reflected to a first intermediate MEMS mirror located on the rightmost side in the $N_3$ first intermediate MEMS mirrors. If the input MEMS mirror rotates around the y axis by an angle $-\gamma_5°/2$, the reflected optical signal of the incident optical signal rotates around the y axis by an angle $-\gamma_5°$, and is reflected to a first intermediate MEMS mirror located on the leftmost side in the $N_3$ first intermediate MEMS mirrors. In this case, if the input MEMS mirror continues to rotate around they axis by an angle $-\gamma_2°/2$, the reflected optical signal of the incident optical signal continues to rotate around the y axis by an angle $-\gamma_2°$, and is reflected to a local drop MEMS mirror located on the leftmost side in the $M_2$ local drop MEMS mirrors. Therefore, to enable the input MEMS mirror to reflect the optical signal to any MEMS mirror in the $M_2$ local drop MEMS mirrors and the $N_3$ first intermediate MEMS mirrors, the following conditions need to be met: $\gamma_2°/2+\gamma_5°/2 \leq \beta$, and $\gamma_3°/2<\beta$. In this way, after the foregoing conditions are met, capabilities of the input MEMS mirror to rotate clockwise and counterclockwise around the y axis may be used as much as possible by setting values of $M_2$ and $N_3$ and relative locations of all MEMS mirrors. Therefore, $M_2+N_3$ is a relatively large value.

Therefore, the MEMS optical switch according to this embodiment of the present invention includes $N_1$ input MEMS mirrors corresponding to $N_1$ input ports on a one-to-one basis and $M_1$ output MEMS mirrors corresponding to $M_1$ output ports on a one-to-one basis. When the first input MEMS mirror reflects an optical signal to a first output MEMS mirror and reflects the optical signal to a second output MEMS mirror, the first input MEMS mirror deflects from a rest state towards an opposite direction relative to a second deflection axis. In this way, a rotation capability of a MEMS mirror can be used more efficiently without changing a maximum rotation angle of the MEMS mirror, and rotation angle utilization of the MEMS mirror is improved. This increases a quantity of ports on the MEMS optical switch, improves integration, and can further meet a requirement for a throughput of a switching node.

Figure 14:
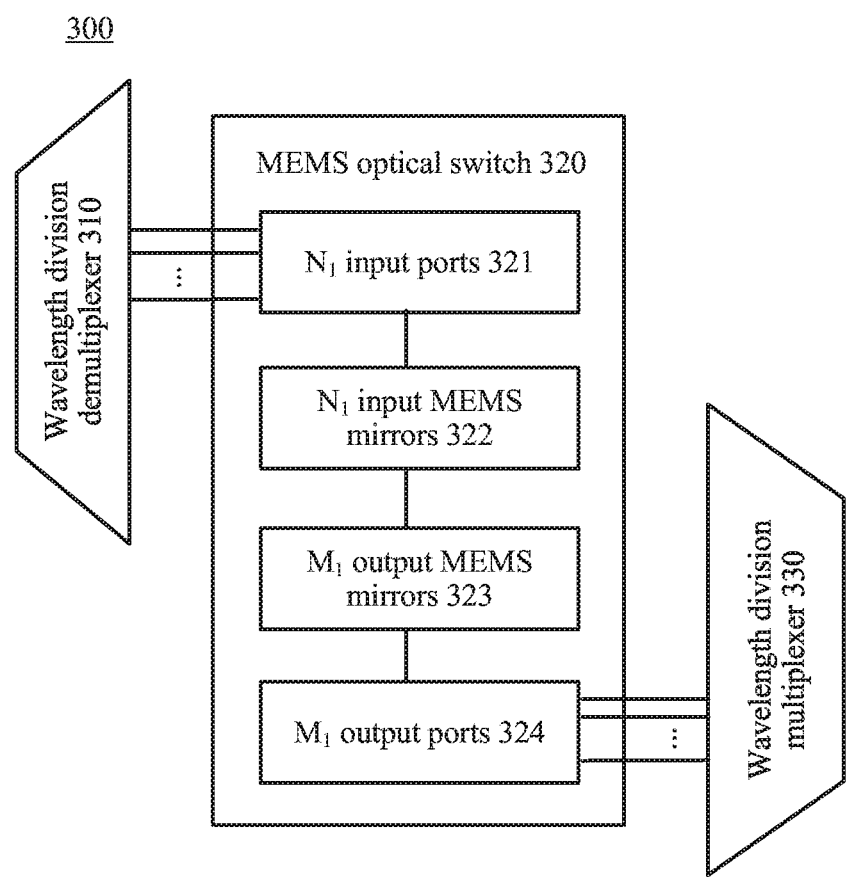
FIG. 14 is a schematic apparatus diagram of a switching node according to an embodiment of the present invention.

For example, FIG. 14 shows a switching node 300 according to an embodiment of the present invention. As shown in FIG. 14, the switching node 300 includes a wavelength division demultiplexer 310, a MEMS optical switch 320, and a wavelength division multiplexer 330. The MEMS optical switch 320 includes $N_1$ input ports 321, $N_1$ input MEMS mirrors 322, $M_1$ output ports 324, and $M_1$ output MEMS mirrors 323. The $N_1$ input MEMS mirrors 322 are corresponding to the $N_1$ input ports 321 on a one-to-one basis, the $M_1$ output MEMS mirrors 323 are corresponding to the $M_1$ output ports 324 on a one-to-one basis, and both $M_1$ and $N_1$ are integers greater than 1.

The wavelength division demultiplexer 310 is configured to receive an optical signal beam including N wavelengths, split the received optical signal beam into N optical signal beams separately having a single wavelength, and transmit the N optical signal beams to the MEMS optical switch, where $N_1 > N \geq 1$.

A first input port in the $N_1$ input ports 321 is configured to receive an optical signal beam in the N optical signal beams transmitted by the wavelength division demultiplexer 310, and transmit the received optical signal beam to a first input MEMS mirror corresponding to the first input port.

The first input MEMS mirror is configured to deflect around at least one of a first deflection axis or a second deflection axis, so as to reflect the received optical signal beam to a first destination output MEMS mirror in the $M_1$ output MEMS mirrors 323. A destination output port of the optical signal beam is a first destination output port corresponding to the first destination output MEMS mirror.

The first destination output MEMS mirror is configured to reflect, to the first destination output port, the received optical signal beam reflected by the first input MEMS mirror.

The first destination output port is configured to transmit, to the wavelength division multiplexer 330, the received optical signal beam reflected by the first destination output MEMS mirror.

The wavelength division multiplexer 330 is configured to receive at least one optical signal beam output from at least one of the $M_1$ output ports 324, multiplex the at least one optical signal beam to an optical signal beam including at least one wavelength, and output the optical signal beam including at least one wavelength. The at least one output port includes the first destination output port.

Along a straight line in which the first deflection axis is located, the first input MEMS mirror is located on an edge of the $N_1$ input MEMS mirrors 322, and when reflecting the received optical signal beam to a first output MEMS mirror and a second output MEMS mirror, the first input MEMS mirror deflects from a rest state towards an opposite direction relative to the second deflection axis. The $M_1$ output MEMS mirrors 323 include the first output MEMS mirror and the second output MEMS mirror.

The MEMS optical switch 320 may be any MEMS optical switch 200 shown in FIG. 2 to FIG. 12. The switching node 300 may include one or more wavelength division demultiplexers 310, and include one or more wavelength division multiplexers 330. This is not limited in this embodiment of the present invention.

Optionally, the $M_1$ output MEMS mirrors 323 are constituted by $M_2$ local drop MEMS mirrors and $M_3$ other output MEMS mirrors, and the $M_1$ output ports 324 are constituted by $M_2$ local drop ports and $M_3$ other output ports, where $M_1 > M_2 \geq 1$ and $M_1 > M_3 > 1$.

The $M_2$ local drop MEMS mirrors are corresponding to the $M_2$ local drop ports on a one-to-one basis, and an optical signal output from each of the $M_2$ local drop ports is transmitted to the switching node 300.

The $M_3$ other output MEMS mirrors are corresponding to the $M_3$ other output ports on a one-to-one basis, and an optical signal output from each of the $M_3$ other output ports is transmitted to the wavelength division multiplexer 330.

Optionally, in another embodiment, the $M_2$ local drop MEMS mirrors include the first output MEMS mirror, and the $M_3$ other output MEMS mirrors include the second output MEMS mirror.

Optionally, in another embodiment, the MEMS optical switch 320 further includes $N_2$ add ports and $N_2$ add MEMS mirrors, where $N_2 \geq 1$. The $N_2$ add MEMS mirrors are corresponding to the $N_2$ add ports on a one-to-one basis.

A first add port in the $N_2$ add ports is configured to transmit a second optical signal from a location in which the switching node is located to a first add MEMS mirror corresponding to the first add port.

The first add MEMS mirror is configured to deflect around at least one of the first deflection axis or the second deflection axis, so as to reflect the received second optical signal to a second destination output MEMS mirror in the $M_1$ output MEMS mirrors 323. A destination output port of the second optical signal is a second destination output port corresponding to the second destination output MEMS mirror.

The second destination output MEMS mirror is configured to reflect the received second optical signal to the second destination output port.

The second destination output port is configured to transmit, to the wavelength division multiplexer, the second optical signal reflected by the second destination output MEMS mirror.

Optionally, in another embodiment, in a direction of at least one of the first deflection axis or the second deflection axis, the $M_2$ local drop MEMS mirrors are adjacently arranged and the $M_3$ other output MEMS mirrors are adjacently arranged.

Optionally, in another embodiment, the MEMS optical switch 320 further includes $N_3$ first intermediate MEMS mirrors, where $N_3 > 1$.

The first input MEMS mirror is specifically configured to deflect around at least one of the first deflection axis or the second deflection axis, so as to directly reflect the received first optical signal to a first intermediate MEMS mirror in the $N_3$ first intermediate MEMS mirrors.

The first intermediate MEMS mirror is configured to reflect, to the first destination output MEMS mirror, the received first optical signal reflected by the first input MEMS mirror.

The first destination output MEMS mirror is specifically configured to reflect, to the first destination output port, the received first optical signal reflected by the first intermediate MEMS mirror.

Optionally, in another embodiment, the $N_3$ first intermediate MEMS mirrors and the $M_2$ local drop MEMS mirrors constitute a MEMS mirror array, and in the direction of at least one of the first deflection axis or the second deflection axis, the $N_3$ first intermediate MEMS mirrors are adjacently arranged and the $M_2$ local drop MEMS mirrors are adjacently arranged.

Optionally, in another embodiment, the MEMS optical switch 320 further includes a reflection element.

If the $M_3$ other output ports include the first destination output port, the first intermediate MEMS mirror is configured to reflect, to the reflection element, the received first optical signal reflected by the first input MEMS mirror.

The reflection element is configured to reflect, to the first destination output MEMS mirror, the received first optical signal reflected by the first intermediate MEMS mirror.

The first destination output MEMS mirror is specifically configured to reflect, to the first destination output port, the received first optical signal reflected by the reflection element.

The first destination output port is specifically configured to transmit, to the wavelength division multiplexer 330, the first optical signal reflected by the first destination output MEMS mirror.

Optionally, in another embodiment, the reflection element includes a first reflection mirror and/or $N_4$ second intermediate MEMS mirrors, where $N_4 > 1$.

Optionally, in another embodiment, if the reflection element includes the first reflection mirror and the $N_4$ second intermediate MEMS mirrors, the first intermediate MEMS mirror is specifically configured to reflect, to the first reflection mirror, the received first optical signal reflected by the first input MEMS mirror; the first reflection mirror is configured to reflect, to a second intermediate MEMS mirror in the $N_4$ second intermediate MEMS mirrors, the received first optical signal reflected by the first intermediate MEMS mirror; and the second intermediate MEMS mirror is configured to reflect, to the first destination output MEMS mirror, the received first optical signal reflected by the first reflection mirror.

Optionally, in another embodiment, the MEMS optical switch 320 further includes $N_3$ microlenses.

The first intermediate MEMS mirror is specifically configured to reflect, to a first microlens in the $N_3$ microlenses, the received first optical signal reflected by the first input MEMS mirror.

The first microlens is configured to perform collimation processing on the received first optical signal reflected by the first intermediate MEMS mirror, and transmit the processed first optical signal to the reflection element.

The reflection element is specifically configured to receive the first optical signal that has undergone the collimation processing performed by the first microlens.

Optionally, in another embodiment, the MEMS optical switch 320 further includes at least one of a second reflection mirror or a third reflection mirror.

Each of the $M_2$ local drop MEMS mirrors is specifically configured to transmit an optical signal to a corresponding local drop port by means of reflection by the second reflection mirror.

Each of the $N_2$ add ports is specifically configured to transmit the second optical signal to a corresponding add MEMS mirror by means of reflection by the third reflection mirror.

Therefore, according to the switching node in this embodiment of the present invention, a MEMS optical switch includes $N_1$ input MEMS mirrors corresponding to $N_1$ input ports on a one-to-one basis and $M_1$ output MEMS mirrors corresponding to $M_1$ output ports on a one-to-one basis. When the first input MEMS mirror reflects an optical signal to a first output MEMS mirror and reflects the optical signal to a second output MEMS mirror, the first input MEMS mirror deflects from a rest state towards an opposite direction relative to a second deflection axis. In this way, a rotation capability of a MEMS mirror can be used more efficiently without changing a maximum rotation angle of the MEMS mirror, and rotation angle utilization of the MEMS mirror is improved. This increases a quantity of ports on the MEMS optical switch, improves integration, and can further meet a requirement for a throughput of the switching node.

Figure 15:
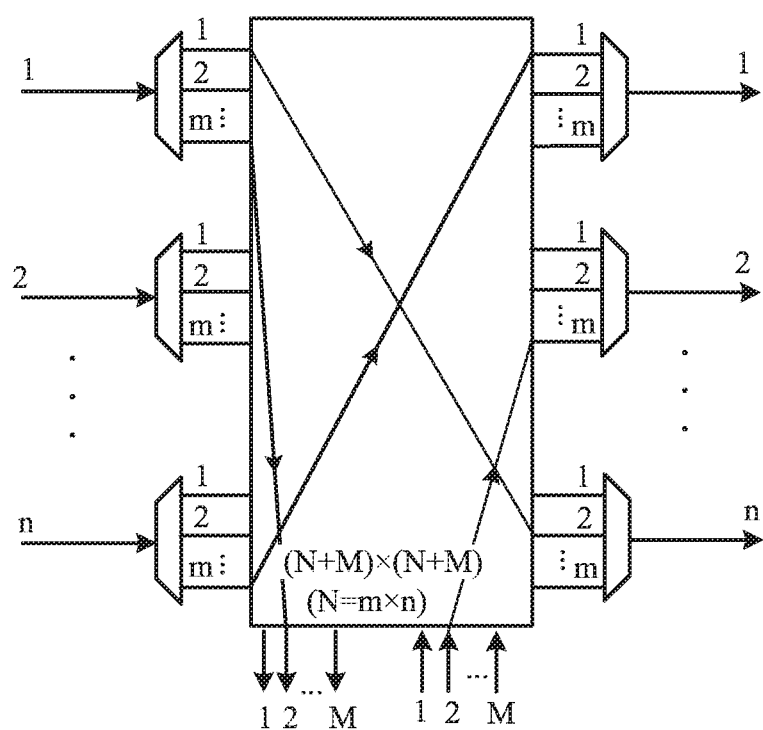
FIG. 15 is a schematic apparatus diagram of switching of an optical path of a switching node according to an embodiment of the present invention.

FIG. 15 is a schematic diagram of an optical path of a switching node 300 according to an embodiment of the present invention. The switching node 300 can implement switching of (N+M)×(N+M) optical signals. In this case, $N_1 = M_3 = N$, and $N_2 = M_2 = M$. Specifically, n optical signals from other nodes are input to n wavelength division demultiplexers 310, and each optical signal is demultiplexed into m optical signals separately having a single wavelength and the m optical signals are input to the MEMS optical switch 320, where n×m=N. M optical signals that need to be dropped to a location in which the switching node is located are output from drop ports to the location in which the switching node is located. N optical signals that need to be sent to other nodes are separately switched to destination output ports corresponding to destination nodes of the optical signals. In addition, M optical signals that are from the location in which the switching node is located and that need to be switched to other nodes may be input from add ports of the MEMS optical switch 320, and are separately switched to destination output ports corresponding to destination nodes of the optical signals. It may be learned that, compared with the switching node shown in FIG. 1a in the prior art, a quantity of ports of the MEMS optical switch provided in this embodiment of the present invention is increased from N to (M+N), and accordingly, the switching node can process more optical signals.

Therefore, according to the switching node in this embodiment of the present invention, a configured MEMS optical switch includes $N_1$ input MEMS mirrors corresponding to $N_1$ input ports on a one-to-one basis and $M_1$ output MEMS mirrors corresponding to $M_1$ output ports on a one-to-one basis. When the first input MEMS mirror reflects an optical signal to a first output MEMS mirror and reflects the optical signal to a second output MEMS mirror, the first input MEMS mirror deflects from a rest state towards an opposite direction relative to a second deflection axis. In this way, a rotation capability of a MEMS mirror can be used more efficiently without changing a maximum rotation angle of the MEMS mirror, and rotation angle utilization of the MEMS mirror is improved. This increases a quantity of ports on the MEMS optical switch, improves integration, and can further meet a requirement for a throughput of the switching node.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present embodiments. Any modification or replacement readily figured out by a person skilled in the art within the technical scope disclosed in the present embodiments shall fall within the protection scope of the present embodiments. Therefore, the protection scope of the present embodiments shall be subject to the protection scope of the claims.

What is claimed is:

1. A micro-electro-mechanical system (MEMS) optical switch, comprising:
   $N_1$ input ports disposed on an input port plane, wherein each input port of the $N_1$ input ports is adjacent to another input port of the $N_1$ input ports;
   $N_1$ input MEMS mirrors disposed on an input mirror plane, wherein each input MEMS mirror of the $N_1$ input MEMS mirrors is adjacent to another input MEMS mirror of the $N_1$ input MEMS mirrors;
   $M_1$ output ports disposed on an output port plane, wherein each output port of the $M_1$ output ports is adjacent to another output port of the $M_1$ output ports; and
   $M_1$ output MEMS mirrors disposed on an output mirror plane, wherein each output MEMS mirror of the $M_1$ output MEMS mirrors is adjacent to another output MEMS mirror of the $M_1$ output MEMS mirrors, wherein the $N_1$ input MEMS mirrors correspond to the $N_1$ input ports on a one-to-one basis, the $M_1$ output MEMS mirrors correspond to the $M_1$ output ports on a one-to-one basis, and $M_1$ and $N_1$ are integers greater than 1, wherein the input mirror plane is non-parallel with the input port plane and the output port plane, and wherein the output mirror plane is non-parallel with the input port plane and the output port plane;

wherein a first input port of the $N_1$ input ports is configured to transmit a first optical signal from another node to a first input MEMS mirror of the $N_1$ input MEMS mirrors corresponding to the first input port, wherein the another node is a node to which the MEMS optical switch does not belong;

wherein the first input MEMS mirror is configured to deflect around at least one of a first deflection axis or a second deflection axis, to reflect the first optical signal to a first destination output MEMS mirror of the $M_1$ output MEMS mirrors, wherein a destination output port of the first optical signal is a first destination output port corresponding to the first destination output MEMS mirror;

wherein the first destination output MEMS mirror is configured to reflect, to the first destination output port, the first optical signal reflected by the first input MEMS mirror; and wherein the first input MEMS mirror is located on an edge of the $N_1$ input MEMS mirrors along a straight line on the first deflection axis;

wherein the first input MEMS mirror deflects from a rest state towards a first direction relative to the second deflection axis, while reflecting the first optical signal to a first output MEMS mirror of the $M_1$ output MEMS mirrors; and wherein the first input MEMS mirror deflects from the rest state towards a second direction relative to the second deflection axis and different from the first direction, while reflecting the first optical signal to a second output MEMS mirror of the $M_1$ output MEMS mirrors.

2. The MEMS optical switch according to claim 1, wherein the $M_1$ output MEMS mirrors comprise $M_2$ local drop MEMS mirrors and $M_3$ other output MEMS mirrors, wherein the $M_1$ output ports comprise $M_2$ local drop ports and $M_3$ other output ports, wherein $M_1 > M_2 \geq 1$ and $M_1 > M_3 > 1$;

wherein the $M_2$ local drop MEMS mirrors correspond to the $M_2$ local drop ports on a one-to-one basis, and wherein optical signals output from the $M_2$ local drop ports are transmitted to a node to which the MEMS optical switch belongs; and wherein the $M_3$ other output MEMS mirrors correspond to the $M_3$ other output ports on a one-to-one basis, and wherein optical signals output from the $M_3$ other output ports are transmitted to a second node to which the MEMS optical switch does not belong.

3. The MEMS optical switch according to claim 2, further comprising:

$N_2$ add ports and $N_2$ add MEMS mirrors, wherein $N_2 \geq 1$, and wherein the $N_2$ add MEMS mirrors correspond to the $N_2$ add ports on a one-to-one basis;

wherein a first add port of the $N_2$ add ports is configured to transmit a second optical signal from the node to which the MEMS optical switch belongs to a first add MEMS mirror corresponding to the first add port;

wherein the first add MEMS mirror is configured to deflect around at least one of the first deflection axis or the second deflection axis, to reflect the second optical signal to a second destination output MEMS mirror of the $M_1$ output MEMS mirrors, wherein a destination output port of the second optical signal is a second destination output port corresponding to the second destination output MEMS mirror; and wherein the second destination output MEMS mirror is configured to reflect the second optical signal to the second destination output port.

4. The MEMS optical switch according to claim 3, wherein in a direction of at least one of the first deflection axis or the second deflection axis, the $M_2$ local drop MEMS mirrors are adjacently arranged and the $M_3$ other output MEMS mirrors are adjacently arranged.

5. The MEMS optical switch according to claim 3, further comprising:

$N_3$ first intermediate MEMS mirrors, wherein $N_3 > 1$;

wherein the first input MEMS mirror is further configured to deflect around at least one of the first deflection axis or the second deflection axis, to directly reflect the first optical signal to a first intermediate MEMS mirror of the $N_3$ first intermediate MEMS mirrors;

wherein the first intermediate MEMS mirror is configured to reflect, to the first destination output MEMS mirror, the first optical signal reflected by the first input MEMS mirror; and wherein the first destination output MEMS mirror is further configured to reflect, to the first destination output port, the first optical signal reflected by the first intermediate MEMS mirror.

6. The MEMS optical switch according to claim 5, wherein the $N_3$ first intermediate MEMS mirrors and the $M_2$ local drop MEMS mirrors constitute a MEMS mirror array, and wherein the $N_3$ first intermediate MEMS mirrors are adjacently arranged, and the $M_2$ local drop MEMS mirrors are adjacently arranged, in a direction of at least one of the first deflection axis or the second deflection axis.

7. The MEMS optical switch according to claim 5, further comprising:

a reflection element;

wherein the first intermediate MEMS mirror is configured to reflect, to the reflection element, the first optical signal reflected by the first input MEMS mirror, wherein the $M_3$ other output ports comprising the first destination output port;

wherein the reflection element is configured to reflect, to the first destination output MEMS mirror, the first optical signal reflected by the first intermediate MEMS mirror; and wherein the first destination output MEMS mirror is further configured to reflect, to the first destination output port, the first optical signal reflected by the reflection element.

8. The MEMS optical switch according to claim 7, wherein the reflection element comprises a first reflection mirror or $N_4$ second intermediate MEMS mirrors, wherein $N_4 > 1$.

9. The MEMS optical switch according to claim 8, wherein the first intermediate MEMS mirror is further configured to reflect, to the first reflection mirror, the first optical signal reflected by the first input MEMS mirror, wherein the reflection element comprises the first reflection mirror and the $N_4$ second intermediate MEMS mirrors;

wherein the first reflection mirror is configured to reflect, to a second intermediate MEMS mirror of the $N_4$ second intermediate MEMS mirrors, the first optical signal reflected by the first intermediate MEMS mirror; and wherein the second intermediate MEMS mirror is configured to reflect, to the first destination output MEMS mirror, the first optical signal reflected by the first reflection mirror.

10. A switching node, comprising:
a micro-electro-mechanical system (MEMS) optical switch, a wavelength division multiplexer, and a wavelength division demultiplexer, wherein the MEMS optical switch comprises:
   $N_1$ input ports disposed on an input port plane, wherein each input port of the $N_1$ input ports is adjacent to another input port of the $N_1$ input ports;
   $N_1$ input MEMS mirrors disposed on an input mirror plane, wherein each input MEMS mirror of the $N_1$ input MEMS mirrors is adjacent to another input MEMS mirror of the $N_1$ input MEMS mirrors;
   $M_1$ output ports disposed on an output port plane, wherein each output port of the $M_1$ output ports is adjacent to another output port of the $M_1$ output ports; and
   $M_1$ output MEMS mirrors disposed on an output mirror plane, wherein each output MEMS mirror of the $M_1$ output MEMS mirrors is adjacent to another output MEMS mirror of the $M_1$ output MEMS mirrors, wherein the $N_1$ input MEMS mirrors correspond to the $N_1$ input ports on a one-to-one basis, wherein the $M_1$ output MEMS mirrors correspond to the $M_1$ output ports on a one-to-one basis, and wherein $M_1$ and $N_1$ are integers greater than 1, wherein the input mirror plane is non-parallel with the input port plane and the output port plane, and wherein the output mirror plane is non-parallel with the input port plane and the output port plane;
wherein the wavelength division demultiplexer is configured to:
   receive an optical signal beam comprising N wavelengths;
   split the optical signal beam into N optical signal beams separately having a same wavelength; and
   transmit the N optical signal beams to the MEMS optical switch, wherein $N_1 \geq N \geq 1$;
wherein a first input port of the $N_1$ input ports is configured to:
   receive a first optical signal of the N optical signals transmitted by the wavelength division demultiplexer; and
   transmit the first optical signal to a first input MEMS mirror corresponding to the first input port;
wherein the first input MEMS mirror is configured to deflect around at least one of a first deflection axis or a second deflection axis, to reflect the first optical signal to a first destination output MEMS mirror of the $M_1$ output MEMS mirrors, wherein a destination output port of the first optical signal is a first destination output port corresponding to the first destination output MEMS mirror;
wherein the first destination output MEMS mirror is configured to reflect, to the first destination output port, the first optical signal reflected by the first input MEMS mirror;
wherein the first destination output port is configured to transmit, to the wavelength division multiplexer or to a location of the switching node, the first optical signal reflected by the first destination output MEMS mirror;
wherein the wavelength division multiplexer is configured to:
   receive at least one optical signal beam output from at least one of the $M_1$ output ports;
   multiplex the at least one optical signal beam to an optical signal beam comprising at least one wavelength; and
   output the optical signal beam comprising at least one wavelength, wherein the at least one output port comprises the first destination output port; and
wherein the first input MEMS mirror is located on an edge of the $N_1$ input MEMS mirrors, along a straight line of the first deflection axis, wherein the first input MEMS mirror deflects from a rest state towards a first direction relative to the second deflection axis while reflecting the first optical signal to a first output MEMS mirror; and
wherein the first input MEMS mirror deflects from a rest state towards a second direction relative to the second deflection axis and different from the first direction while reflecting the first optical signal to a second output MEMS mirror, wherein the $M_1$ output MEMS mirrors comprise the first output MEMS mirror and the second output MEMS mirror.

11. The switching node according to claim 10, wherein the $M_1$ output MEMS mirrors comprise $M_2$ local drop MEMS mirrors and $M_3$ other output MEMS mirrors, wherein the $M_1$ output ports comprise $M_2$ local drop ports and $M_3$ other output ports, wherein $M_1 > M_2 \geq 1$ and $M_1 > M_3 > 1$;
   wherein the $M_2$ local drop MEMS mirrors correspond to the $M_2$ local drop ports on a one-to-one basis, and wherein optical signals output from the $M_2$ local drop ports are transmitted to the location of the switching node; and
   wherein the $M_3$ other output MEMS mirrors correspond to the $M_3$ other output ports on a one-to-one basis, and wherein optical signals output from the $M_3$ other output ports are transmitted to the wavelength division multiplexer.

12. The switching node according to claim 11, wherein the MEMS optical switch further comprises $N_2$ add ports and $N_2$ add MEMS mirrors, wherein $N_2 \geq 1$, and wherein the $N_2$ add MEMS mirrors correspond to the $N_2$ add ports on a one-to-one basis;
   wherein a first add port of the $N_2$ add ports is configured to transmit a second optical signal from the location of the switching node to a first add MEMS mirror corresponding to the first add port;
   wherein the first add MEMS mirror is configured to deflect around the first deflection axis or the second deflection axis, to reflect the second optical signal to a second destination output MEMS mirror of the $M_1$ output MEMS mirrors, wherein a destination output port of the second optical signal is a second destination output port corresponding to the second destination output MEMS mirror;
   wherein the second destination output MEMS mirror is configured to reflect the second optical signal to the second destination output port; and
   wherein the second destination output port is configured to transmit, to the wavelength division multiplexer, the second optical signal reflected by the second destination output MEMS mirror.

13. The switching node according to claim 12, wherein the $M_2$ local drop MEMS mirrors are adjacently arranged, and the $M_3$ other output MEMS mirrors are adjacently arranged, in a direction of at least one of the first deflection axis or the second deflection axis.

14. The switching node according to claim 12, wherein the MEMS optical switch further comprises $N_3$ first intermediate MEMS mirrors, wherein $N_3 > 1$;
   wherein the first input MEMS mirror is further configured to deflect around at least one of the first deflection axis or the second deflection axis, to directly reflect the first optical signal to a first intermediate MEMS mirror in the $N_3$ first intermediate MEMS mirrors;

wherein the first intermediate MEMS mirror is configured to reflect, to the first destination output MEMS mirror, the first optical signal reflected by the first input MEMS mirror; and wherein the first destination output MEMS mirror is further configured to reflect, to the first destination output port, the first optical signal reflected by the first intermediate MEMS mirror.

15. The switching node according to claim 14, wherein the $N_3$ first intermediate MEMS mirrors and the $M_2$ local drop MEMS mirrors constitute a MEMS mirror array, and wherein the $N_3$ first intermediate MEMS mirrors are adjacently arranged, and the $M_2$ local drop MEMS mirrors are adjacently arranged, in a direction of at least one of a first deflection axis or a second deflection axis.

16. The switching node according to claim 14, wherein the MEMS optical switch further comprises:

a reflection element;

wherein the first intermediate MEMS mirror is configured to reflect, to the reflection element, the first optical signal reflected by the first input MEMS mirror, wherein the $M_3$ other output ports comprise the first destination output port;

wherein the reflection element is configured to reflect, to the first destination output MEMS mirror, the first optical signal reflected by the first intermediate MEMS mirror;

wherein the first destination output MEMS mirror is further configured to reflect, to the first destination output port, the first optical signal reflected by the reflection element; and wherein the first destination output port is further configured to transmit, to the wavelength division multiplexer, the first optical signal reflected by the first destination output MEMS mirror.

17. The switching node according to claim 16, wherein the reflection element comprises a first reflection mirror or $N_4$ second intermediate MEMS mirrors, wherein $N_4>1$.

18. The switching node according to claim 17, wherein the first intermediate MEMS mirror is further configured to reflect, to the first reflection mirror, the first optical signal reflected by the first input MEMS mirror, wherein the reflection element comprises the first reflection mirror and the $N_4$ second intermediate MEMS mirrors;

wherein the first reflection mirror is configured to reflect, to a second intermediate MEMS mirror in the $N_4$ second intermediate MEMS mirrors, the first optical signal reflected by the first intermediate MEMS mirror; and wherein the second intermediate MEMS mirror is configured to reflect, to the first destination output MEMS mirror, the first optical signal reflected by the first reflection mirror.

19. The MEMS optical switch according to claim 1, wherein each input MEMS mirror of the $N_1$ input MEMS mirrors is configured to deflect at $M_1$ different angles, wherein each angle of the $M_1$ different angles is associated with a different output MEMS mirror of the $M_1$ output MEMS mirrors, wherein at least a first portion of the $M_1$ different angles is in a third direction from the rest state for the respective input MEMS mirror, wherein at least a second portion of the $M_1$ different angles is in a fourth direction from the rest state for the respective input MEMS mirror, wherein the third direction is different from, and opposite of, the fourth direction, and wherein each input MEMS mirror of the $N_1$ input MEMS mirrors is further configured to reflect an optical signal from a corresponding input port of the $N_1$ input ports to each output MEMS mirror of the $M_1$ output MEMS mirrors, respectively, according to the associated angle of the $M_1$ different angles.

20. The switching node according to claim 10, wherein each input MEMS mirror of the $N_1$ input MEMS mirrors is configured to deflect at $M_1$ different angles, wherein each angle of the $M_1$ different angles is associated with a different output MEMS mirror of the $M_1$ output MEMS mirrors, wherein at least a first portion of the $M_1$ different angles is in a third direction from the rest state for the respective input MEMS mirror, wherein at least a second portion of the $M_1$ different angles is in a fourth direction from the rest state for the respective input MEMS mirror, wherein the third direction is different from, and opposite of, the fourth direction, and wherein each input MEMS mirror of the $N_1$ input MEMS mirrors is further configured to reflect an optical signal from a corresponding input port of the $N_1$ input ports to each output MEMS mirror of the $M_1$ output MEMS mirrors, respectively, according to the associated angle of the $M_1$ different angles.

* * * * *